United States Patent
Zhao et al.

(10) Patent No.: US 11,450,350 B2
(45) Date of Patent: Sep. 20, 2022

(54) VIDEO RECORDING METHOD AND APPARATUS, VIDEO PLAYING METHOD AND APPARATUS, DEVICE, AND STORAGE MEDIUM

(71) Applicant: Tencent Technology (Shenzhen) Company Limited, Guangdong (CN)

(72) Inventors: Fengli Zhao, Guangdong (CN); Yingzhong Chen, Guangdong (CN); Huiyu He, Guangdong (CN); Yeqi Zhang, Guangdong (CN); Yue Xu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/075,856

(22) Filed: Oct. 21, 2020

(65) Prior Publication Data
US 2021/0035609 A1 Feb. 4, 2021

Related U.S. Application Data

(63) Continuation of application No. PCT/CN2019/109944, filed on Oct. 8, 2019.

(30) Foreign Application Priority Data

Oct. 25, 2018 (CN) .......................... 201811252045.2

(51) Int. Cl.
*G11B 27/031* (2006.01)
*H04N 5/76* (2006.01)
*G06F 3/0482* (2013.01)

(52) U.S. Cl.
CPC ............ *G11B 27/031* (2013.01); *H04N 5/76* (2013.01); *G06F 3/0482* (2013.01)

(58) Field of Classification Search
CPC ........ G11B 27/031; H04N 5/76; G06F 3/0482
See application file for complete search history.

(56) References Cited

U.S. PATENT DOCUMENTS

| 10,313,403 | B2 * | 6/2019 | Ciofalo | ............... G06F 3/04842 |
| 2003/0188321 | A1 * | 10/2003 | Shoff | ................... H04N 21/235 725/135 |

(Continued)

FOREIGN PATENT DOCUMENTS

| CN | 102903377 A | 1/2013 |
| CN | 102946549 A | 2/2013 |

(Continued)

OTHER PUBLICATIONS

International Search Report and Written Opinion dated Jan. 3, 2020 in International Application No. PCT/CN2019/109544, 11 pgs.

(Continued)

*Primary Examiner* — Mishawn N. Hunter
(74) *Attorney, Agent, or Firm* — ArentFox Schiff LLP

(57) ABSTRACT

A video recording method, performed by a video recording terminal for recording an interactive video, includes acquiring a recorded first video clip and displaying an interactive editing control corresponding to the first video clip. The method also includes determining a second video clip in a case that a first operation performed on the interactive editing control is received, and generating interactive control information. The interactive control information instructs to display an interactive control point on the first video clip, the interactive control point triggering playing of the second video clip in a case that a second operation is received. Finally, the method includes obtaining the interactive video including the first video clip, the second video (Continued)

clip, and the interactive control information. The first video clip and the second video clip have an interactive relationship in the interactive video.

20 Claims, 14 Drawing Sheets

(56) References Cited

U.S. PATENT DOCUMENTS

| | | | |
|---|---|---|---|
| 2013/0094830 A1 | 4/2013 | Stone et al. | |
| 2014/0013230 A1* | 1/2014 | Malone | H04N 21/4786 715/723 |
| 2018/0249206 A1* | 8/2018 | Drori | H04N 21/4725 |

FOREIGN PATENT DOCUMENTS

| | | |
|---|---|---|
| CN | 103533396 A | 1/2014 |
| CN | 104199841 A | 12/2014 |
| CN | 104869477 A | 8/2015 |
| CN | 105227864 A | 1/2016 |
| CN | 105721813 A | 6/2016 |
| CN | 106060343 A | 10/2016 |
| CN | 106998486 A | 8/2017 |
| CN | 107155128 A | 9/2017 |
| CN | 107832366 A | 3/2018 |
| CN | 107948562 A | 4/2018 |
| CN | 108024139 A | 5/2018 |
| CN | 108156523 A | 6/2018 |
| CN | 108260014 A | 7/2018 |
| CN | 108495194 A | 9/2018 |
| CN | 109167950 A | 1/2019 |

OTHER PUBLICATIONS

Chinese Office Action dated Sep. 23, 2019 in Chinese Application No. 201811252045.2, 12 pgs.

* cited by examiner

General control information:

Interactive control information 1: Center position coordinates
Radius
URL of a second video clip 1

Interactive control information 2: Center position coordinates
Radius
URL of a second video clip 2

(a) (b)

(c) (d)

(a)

(b)

(c)

(d)

VIDEO RECORDING METHOD AND APPARATUS, VIDEO PLAYING METHOD AND APPARATUS, DEVICE, AND STORAGE MEDIUM

RELATED APPLICATION

This application is a continuation of International Application No. PCT/CN2019/109944, filed on Oct. 8, 2019, which claims priority to Chinese Patent Application No. 201811252045.2, entitled "VIDEO RECORDING METHOD AND APPARATUS, VIDEO PLAYING METHOD AND APPARATUS DEVICE, AND STORAGE MEDIUM" and filed on Oct. 25, 2018. The entire disclosures of the prior applications are hereby incorporated by reference in their entirety.

FIELD OF THE TECHNOLOGY

This application relates to the field of video processing technologies, including a video recording method and apparatus, a video playing method and apparatus, a device, and a storage medium.

BACKGROUND OF THE DISCLOSURE

With the continuous development of mobile Internet applications, video sharing applications are used increasingly widely. A video publisher may use a video sharing application to record a video and upload the video to a server. Other users may use the video sharing application to download from the server and play the video.

In the related art, to allow interaction with a video when a user watches the video, a video sharing application usually provides one or more interactive buttons. When watching a video, a user can interact with a video publisher or a video by using the interactive button. For example, the user may use the interactive button to like, comment on or forward a video.

In the foregoing solution, a user can only use interactive buttons provided by a sharing application to interact with a video. There are only simple forms of interaction.

SUMMARY

According to various embodiments of this application, a video recording method and apparatus, a video playing method and apparatus, a device, and a storage medium are provided.

In an embodiment, a video recording method is performed by a video recording terminal for recording an interactive video. The interactive video includes at least two video clips having an relationship, and the method includes acquiring a recorded first video clip. The method further includes displaying an interactive editing control corresponding to the first video clip, and determining a second video clip in a case that a first operation performed on the interactive editing control is received. The method also includes generating interactive control information, the interactive control information instructing to display an interactive control point on the first video clip, the interactive control point triggering playing of the second video clip in a case that a second operation is received. Finally, the method includes obtaining the interactive video including the first video clip, the second video clip, and the interactive control information, the first video clip and the second video clip having an interactive relationship in the interactive video.

In an embodiment, a video playing method is performed by a video playing terminal for playing an interactive video. The interactive video includes at least two video clips having an interactive relationship, and the method includes acquiring a first video clip in the interactive video and interactive control information corresponding to the first video clip. The interactive control information is information generated by a video recording terminal after the video recording terminal determines a second video clip having an interactive relationship with the first video clip. The second video clip is acquired according to a first operation performed on interactive editing control corresponding to the first video clip. The interactive editing control is displayed after the video recording terminal performs recording to obtain the first video clip. The method further includes displaying an interactive control point on a playing interface of the first video clip according to the interactive control information. Finally, the method includes playing the second video clip in a case that a fourth operation on the interactive control point is received.

In an embodiment, a video recording apparatus is disposed on a video recording terminal, for playing an interactive video. The interactive video includes at least two video clips having an interactive relationship. The apparatus includes processing circuitry configured to acquire a recorded first video clip, display an interactive editing control corresponding to the first video clip, and determine a second video clip in a case that a first operation performed on the interactive editing control is received. The processing circuitry is also configured to generate interactive control information, the interactive control information instructing to display an interactive control point on the first video clip. The interactive control point triggers playing of the second video clip in a case that a second operation of a user is received. Finally, the processing circuitry is configured to obtain the interactive video including the first video clip, the second video clip, and the interactive control information. The first video clip and the second video clip have an interactive relationship in the interactive video.

It is to be understood that the foregoing general descriptions and the following detailed descriptions are merely for exemplary and explanatory purposes, and do not limit this application.

Details of one or more embodiments of this application are provided in the following accompanying drawings and descriptions. Other features, objectives, and advantages of this application become clear based on the specification, the accompanying drawings, and the claims.

BRIEF DESCRIPTION OF THE DRAWINGS

To describe the technical solutions in the embodiments of this application more clearly, the following briefly describes the accompanying drawings describing the embodiments. The accompanying drawings in the following description show merely some embodiments of this application.

DETAILED DESCRIPTION

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

Before the embodiments of this application are described, several concepts in this application are described first.

1) Description of "short video": a short video is a way of spreading Internet content. In general, a short video is video content that is spread in a short video program and has preset duration (for example, 5 minutes, 20 seconds or 10 seconds). Most short videos are user-created content. A user can use the short video program to watch short videos uploaded by other users and can use the short video program to shoot a short video and upload the short video.

2) Description of "linear video": in an embodiment of this application, a linear video is a video that does not support interaction by a user during video playing. The playing of a linear video is usually controlled by a player. For example, controls such as pause, fast forward, and a playing progress bar are provided in the interface of the player. When a user wants to control the playing of the linear video, the user may click a corresponding control in the interface of the player, and the player controls the linear video to pause, fast forward or jump to a playing time point.

3) Interactive video

3) Description of "interactive video": in an embodiment of this application, an interactive video includes at least two video clips, which may be the same as each other or different. When browsing the video, a user may perform an action, for example, click or drag an object in a video playing interface to control the playing sequence of the video clips or even change video picture.

Figure 1:
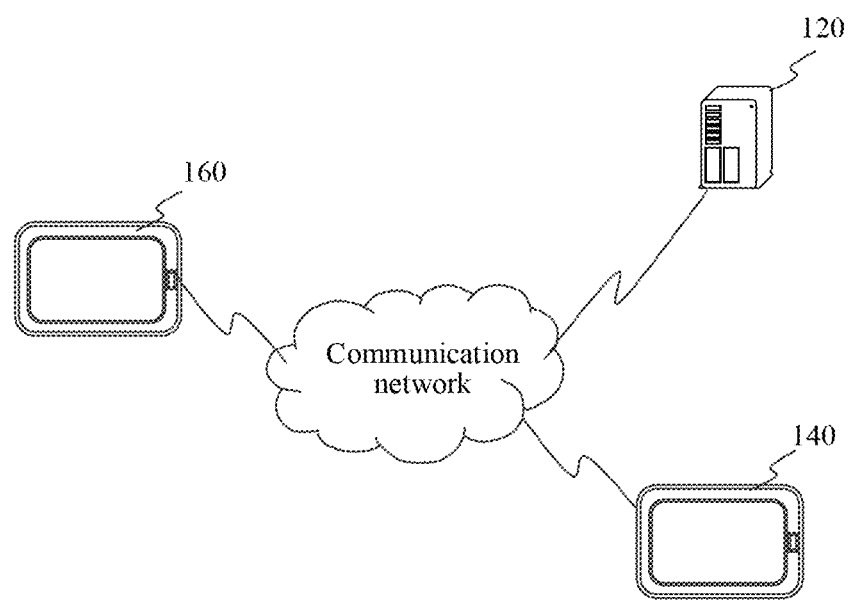
FIG. 1 is a schematic structural diagram of a video publishing system according to an exemplary embodiment.

FIG. 1 is a schematic structural diagram of a video publishing system according to an exemplary embodiment. The system includes a server 120, a plurality of video recording terminals 140, and a plurality of video playing terminals 160.

The server 120 is a server, a plurality of servers, a virtual platform or a cloud computing service center.

The video recording terminal 140 may be a terminal device having a video recording function, a video making function or a video processing function. For example, the video recording terminal 140 may be a mobile phone, a tablet computer, an electronic book reader, smartglasses, a smartwatch, a Moving Picture Experts Group Audio Layer III (MP3) player, a Moving Picture Experts Group Audio Layer IV (MP4) player, a laptop portable computer or a desktop computer.

The video playing terminal 160 may be a terminal device having a video playing function. For example, the video playing terminal 160 may be a mobile phone, a tablet computer, an electronic book reader, smartglasses, a smartwatch, an MP3 player, an MP4 player, a laptop portable computer or a desktop computer.

The video recording terminal 140 and the video playing terminal 160 are respectively connected to the server 120 by a communication network. In an embodiment, the communication network is a wired network or a wireless network.

In an embodiment of this application, the video recording terminal 140 may record a video clip and upload the video clip to the server 120, and the video playing terminal 160 may acquire the video clip from the server 120 and play the video clip.

For example, the video recording terminal 140 generates a video clip through recording. The video recording terminal 140 corresponds to an image acquisition component and an audio acquisition component. The image acquisition component and the audio acquisition component may be parts of the video recording terminal 140. For example, the image acquisition component and the audio acquisition component may be a camera and a microphone built in the video recording terminal 140. Alternatively, the image acquisition component and the audio acquisition component may be peripheral devices of the video recording terminal 140 and are connected to the video recording terminal 140. For example, the image acquisition component and the audio acquisition component may be a camera and a microphone respectively connected to the video recording terminal 140. Alternatively, the image acquisition component and the audio acquisition component may be partially built in the video recording terminal 140 and partially peripheral devices of the video recording terminal 140. For example, the image acquisition component may be a camera built in the video recording terminal 140 and the audio acquisition component may be a microphone in an earphone connected to the video recording terminal 140. The implementation forms of the image acquisition component and the audio acquisition component are not limited in the embodiments of this application. The video recording terminal 140 acquires images and sound by using the image acquisition component and the audio acquisition component, generates a video clip, uploads the video clip to the server 120, and then pushes the video clip to the video playing terminal 160 by using the server 120.

In an embodiment, the system may further include a management apparatus (not shown in FIG. 1) connected to the server 120 by a communication network. In an embodiment, the communication network is a wired network or a wireless network.

In an embodiment, the wireless network or wired network described above uses standard communication technologies and/or protocols. The network is usually the Internet, or may be any network, including, but not limited to, any combination of a local area network (LAN), a metropolitan area network (MAN), a wide area network (WAN) or a mobile, wired or wireless network or a private network or virtual private network (VPN). In some embodiments, technologies and/or formats such as Hypertext Markup Language (HTML) and Extensible Markup Language (XML) are used to represent data exchanged through a network. In addition, all or some links may be encrypted by using conventional encryption technologies such as a Secure Socket Layer (SSL), a Transport Layer Security (TLS), a VPN, and Internet Protocol Security (IPsec). In other embodiments, custom and/or dedicated data communication technologies may also be used in place of or in addition to the foregoing data communication technologies.

In an embodiment, the video recording terminal 140 and the video playing terminal 160 are terminal devices on which the same video sharing application is installed.

A video sharing application is usually used to share video clips (also referred to as short videos) between users. A video clip shared in such an application is usually recorded or generated by a user. In an embodiment, such an application also provides a user with functions such as beautification, a variety of filters, and interesting templates (for example, text templates or music templates) for selection by the user. These video clips generated by a user may usually attract views and attention of more people. However, in the related art, when us a user such an application to browse video clips, a user can perform only a few interactive operations. The user can usually perform only simple interactions, for example, like, send flowers to or comment on a video clip or a video publisher, but cannot interact with the video.

In the solution provided in the embodiment of this application, a user is allowed to participate more in the interaction with a video in a playing stage of a video. For example, in the solution provided in the embodiment of this application, a user may control the playing sequence of a plurality of video clips having an interactive relationship in an interactive video.

Figure 2:
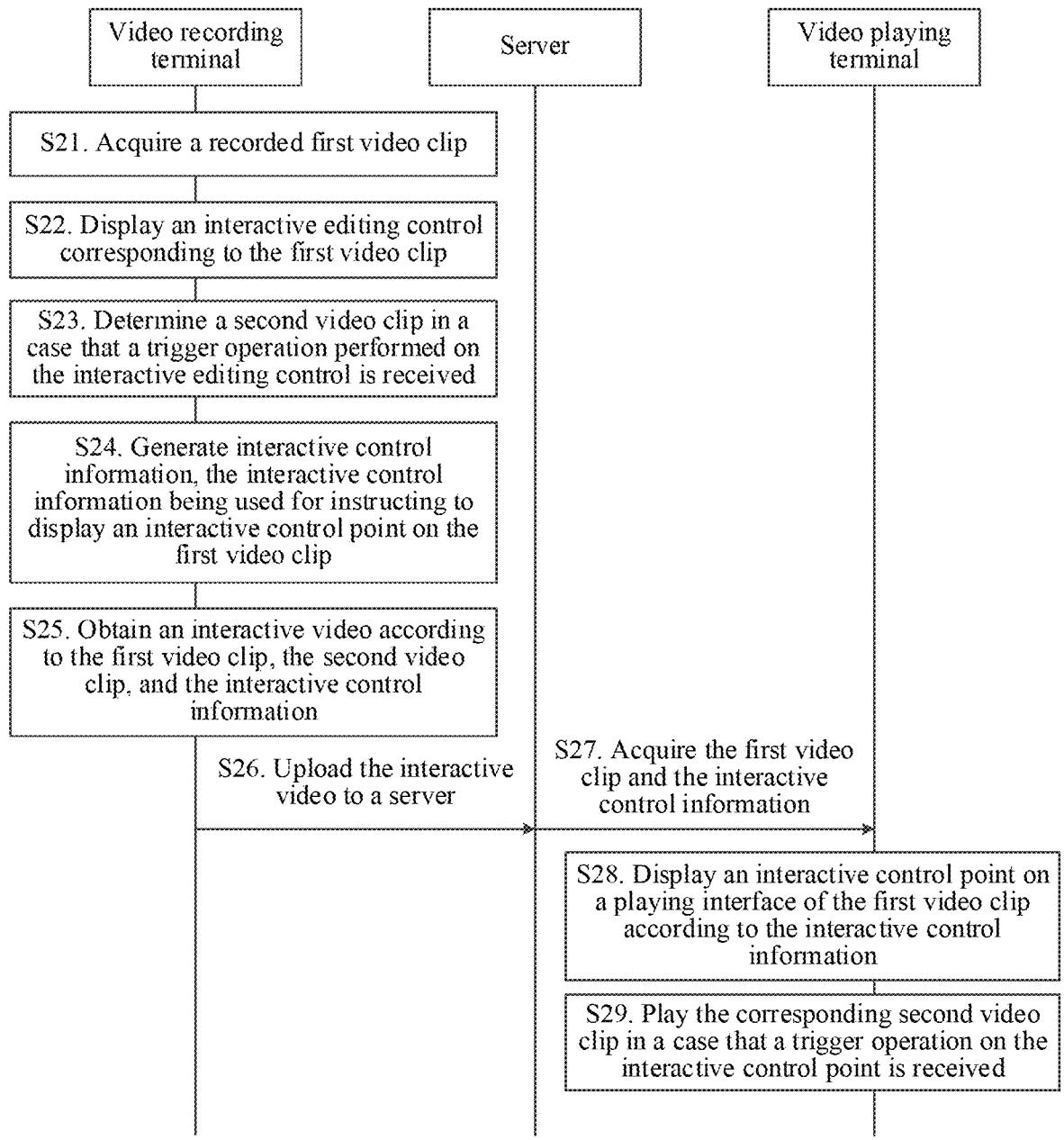
FIG. 2 is a flowchart of a video recording and playing method according to an exemplary embodiment.

FIG. 2 is a flowchart of a video recording and playing method according to an exemplary embodiment. The video recording and playing method may be applied to the video publishing system shown in FIG. 1. As shown in FIG. 2, the video recording and playing method may include the following step.

In step S21, a video recording terminal acquires a recorded first video clip.

It may be understood that the video recording terminal can directly obtain the recorded first video clip. The video recording terminal may further record the first video clip by using the video recording component.

In step S22, the video recording terminal displays an interactive editing control corresponding to the first video clip.

In an embodiment of this application, after finishing recording a video clip, the video recording terminal may display an interactive editing control corresponding to the video clip, to enable a video publisher to establish an interactive relationship between the video clip and another video clip.

In step S23, the video recording terminal determines a second video clip in a case that a trigger operation (or first operation) performed on the interactive editing control is received.

The second video clip may be a video clip that is to be newly recorded by the video recording terminal. Alternatively, the second video clip may be a video clip that has been previously recorded by the video recording terminal.

For example, in a possible implementation, the second video clip is a video clip that is to be newly recorded by the video recording terminal, and the trigger operation is a click operation on an interactive editing control. After the video publisher clicks the interactive editing control, the video recording terminal starts the video recording component to record the second video clip and determines that the newly recorded second video clip has an interactive relationship with the first video clip.

Furthermore, the first video clip may be a video clip other than the second video clip. Alternatively, the second video clip may be the first video clip.

In step S24, the video recording terminal generates interactive control information, the interactive control information being used for instructing to display an interactive control point on the first video clip, the interactive control point being used for triggering the playing of the second video clip in a case that a trigger operation (or second operation) of a user is received.

In step S25, the video recording terminal obtains the interactive video according to the first video clip, the second video clip, and the interactive control information. In an embodiment, the obtained interactive video includes the first video clip, the second video clip, and the interactive control information.

After the video publisher establishes an interactive relationship between the first video clip and the second video clip by using a trigger operation (or first operation) of the interactive editing control, the video recording terminal may generate corresponding interactive control information, so that the interaction between a user and the first video clip can be implemented when a video playing terminal plays the first video clip subsequently. The subsequent video recording terminal may obtain a recorded interactive video by combining recorded video clips and interactive control information corresponding to the video clips. For example, video file data of interactive videos recorded by the video recording terminal may include recorded video clips and interactive control information corresponding to the video clips.

It may be understood that the interactive video includes the first video clip and the second video clip having an interactive relationship.

In an embodiment, after the interactive relationship between the first video clip and the second video clip is established, the video recording terminal may also display an interactive editing control corresponding to the second video clip, and the video publisher may establish an interactive relationship between the second video clip and another video clip by using a trigger operation (or first operation) on the interactive editing control corresponding to the second video clip and generate interactive control information corresponding to the second video clip. That is, the video clips in the interactive video may respectively correspond to respective interactive control information.

In step S26, the video recording terminal uploads the interactive video to a server.

After the video publisher establishes the interactive relationship between the video clips in the interactive video, the video recording terminal uploads the interactive video to the server. For example, after the video publisher clicks to publish the interactive video, the video recording terminal uploads the video clips in the interactive video and the interactive control information corresponding to the video clips to the server.

In step S27, a video playing terminal acquires the first video clip in the interactive video and the interactive control information corresponding to the first video clip from the server.

In an embodiment of this application, when the video playing terminal acquires the first video clip in the interactive video from the server, the interactive control information corresponding to the first video clip is synchronously acquired from the server.

In step S28, the video playing terminal displays an interactive control point on a playing interface of the first video clip according to the interactive control information.

When the video playing terminal plays the first video clip, the interactive control point corresponding to the second video clip having the interactive relationship with the first video clip may be displayed in the playing interface of the first video clip. In an embodiment, when there are a plurality of second video clips, each second video clip corresponds to one interactive control point.

In step S29, the video playing terminal plays the corresponding second video clip in a case that a trigger operation (or second operation) on the interactive control point is received.

In an embodiment of this application, during the recording of an interactive video, the interactive video is recorded in clips. After the video recording terminal records the first video clip in the interactive video, an interactive relationship between the first video clip and the second video clip in the interactive video is set according to user operation. In addition, the interactive, control information for indicating the interactive control point is generated, and the interactive video is obtained by combining the recorded video clips and the interactive control information. When the first video clip is played subsequently, the interactive control point may be displayed on the first video clip according to the interactive control information, and a user triggers the interactive control point to jump to the second video clip for playing. That is, in this application, during the playing of a video clip in the interactive video, the user may trigger the interactive control point to jump to another video clip having an interactive relationship with the current video clip in the same interactive video for playing, so that the user controls the playing sequence between different video clips in the video, thereby extending the modes of interaction between a user and a video.

Through the solution shown in FIG. 2, a user is allowed to use simple click operations to trigger different playing results, so that the user can control the sequence of a plurality of video clips, thereby implementing different application scenes. For example, a teaching process or an examination process may be recorded in a video. After watching a teaching video clip, a user may choose to do some examination questions. The user needs to pass the exam before the user can watch a next video clip. The teaching video clip is played again if the user fails the exam. Alternatively, one video clip may have an interactive relationship with two different video clips. The user may select different branches to watch subsequent different video clips after watching one video clip. The foregoing solution is further described in subsequent embodiments of this application.

Figure 3:
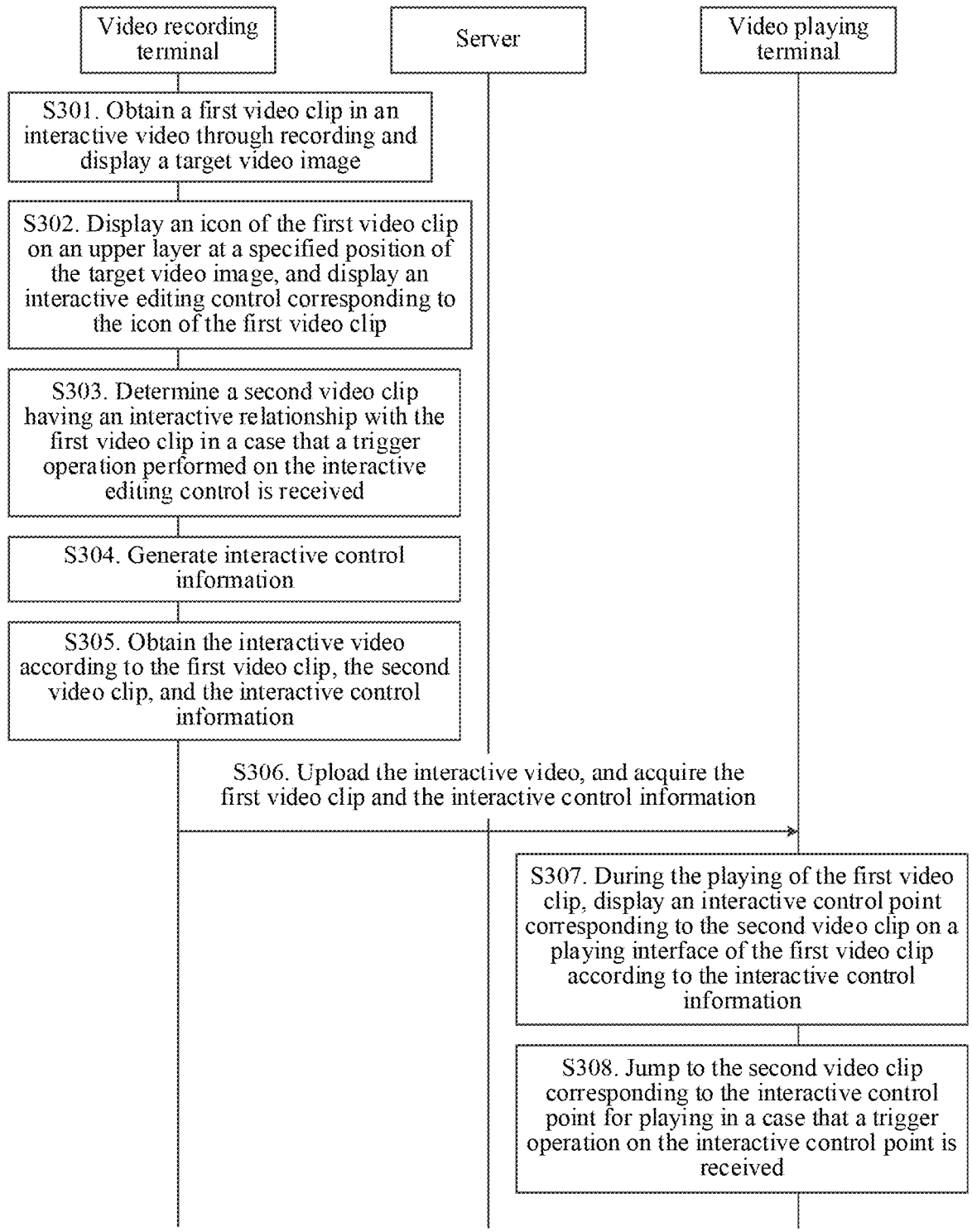
FIG. 3 is a flowchart of a video recording and playing method according to an exemplary embodiment.

FIG. 3 is a flowchart of a video recording and playing method according to an exemplary embodiment. The video recording and playing method may be applied to the video publishing system shown in FIG. 1. As shown in FIG. 3, the video recording and playing method may include the following steps:

In step S301, a video recording terminal obtains a first video clip in an interactive video through recording by a video recording component and displays a target video image, the target video image being any frame of the first video clip.

In an embodiment, the target video image is the last frame of the first video clip.

In an embodiment of this application, after finishing recording a video clip in the interactive video, the video recording terminal may display an interactive relationship establishment interface. The interactive relationship establishment interface includes one image (that is, a target video image) in the first video clip. For example, the background picture of the interactive relationship establishment interface may be the target video image above.

In step S302, the video recording terminal displays an icon of the first video clip (or an icon representing the first video clip) on an upper layer (or superimposed) at a specified position of the target video image, and displays an interactive editing control corresponding to the icon of the first video clip.

The video recording terminal displays an icon of the recorded first video clip on an upper layer at a specified position (for example, the lower half) of the target video image in the displayed interactive relationship establishment interface, and simultaneously displays an interactive editing control corresponding to the icon of the first video clip.

There may be a plurality of specific display forms of the icon of the first video clip and the interactive editing control. For example, the icon of the first video clip may be an image in the first video clip. Alternatively, the icon of the first video clip may be a strip pattern (or rectangular shape icon). The interactive editing control may be a control of an icon having a specific shape. For example, the interactive editing control may be a rectangular button having a corresponding text indication. Alternatively, the interactive editing control may be a "+" shaped control.

Figure 4:
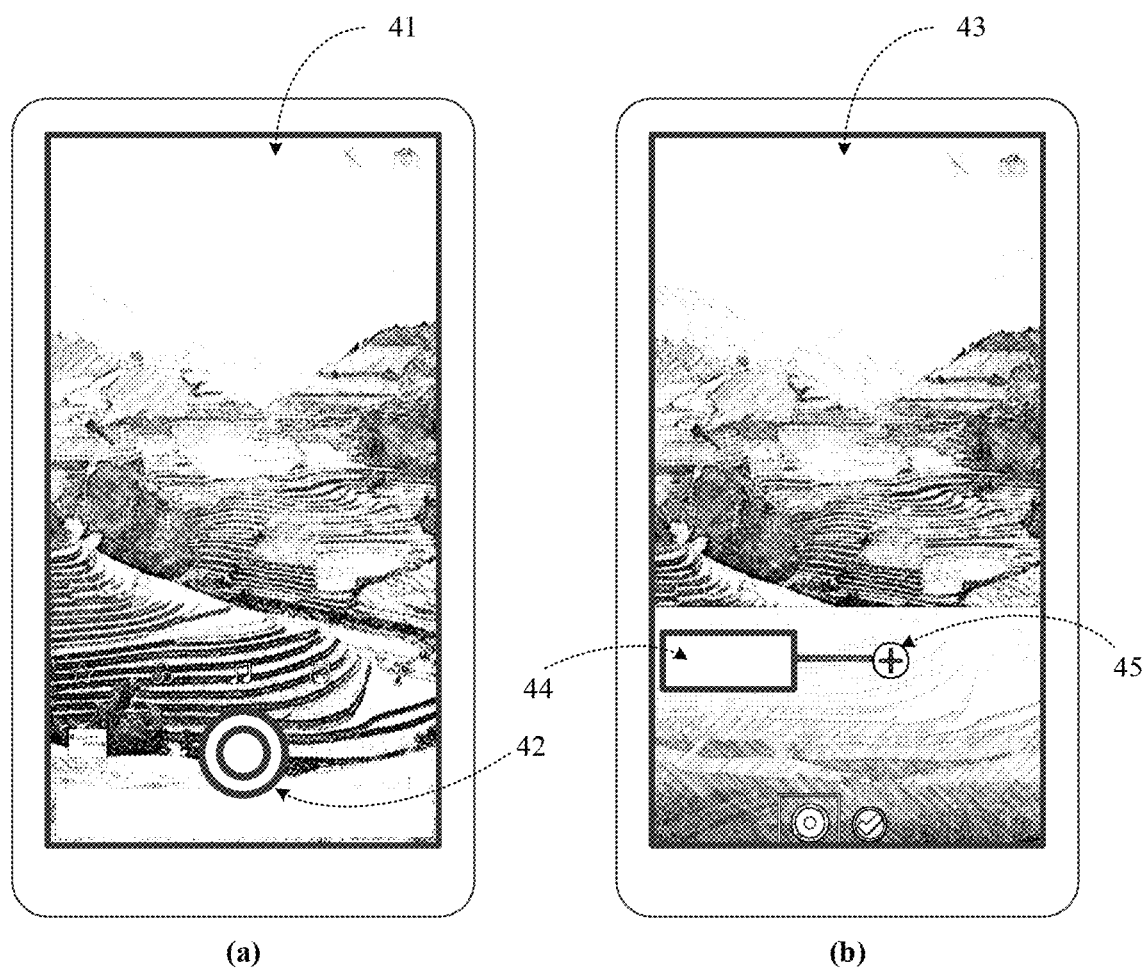
FIG. 4 is a schematic diagram of displaying an interactive editing control in the embodiment shown in FIG. 3.

For example, the icon of the first video clip is a strip pattern, and the interactive editing control is a "+" shaped control. FIG. 4 is a schematic diagram of displaying an interactive editing control according to an embodiment of this application. As shown in the part (a) of FIG. 4, the video recording terminal displays an application interface 41 of a video sharing application. The application interface 41 includes a video recording button 42. After a user clicks the video recording button 42, the video recording terminal starts an image acquisition component (for example, a camera in the video recording terminal) and an audio acquisition component (for example, a microphone in the video recording terminal) to record a first video clip. After the recording of the first video clip is finished, as shown in the part (b) of FIG. 4, the video recording terminal displays an interactive relationship establishment interface 43. The background picture of the interactive relationship establishment interface 43 is the last frame of image in the first video clip. An icon 44 (the strip pattern in the figure) of the first video clip and an interactive editing control 45 (the "+" shaped control in the figure) corresponding to the icon 44 are displayed on the upper layer at the lower half of the interactive relationship establishment interface 43.

In an embodiment, the icon 44 in part (b) of FIG. 4 above is a strip pattern (or rectangular shape icon). The length of the strip pattern is used to indicate the playing duration of the first video clip. For example, the length of the strip pattern is positively correlated to the playing duration of the first video clip (that is, when the length of the strip pattern is larger, the playing duration of the first video clip is longer).

In an embodiment, an identifier of the first video clip, for example, the name of the first video clip, may be displayed in a superimposed manner on the upper layer of (or superimposed on) the icon 44 in the part (b) of FIG. 4 above.

In step S303, when receiving a trigger operation (or first operation) performed on the interactive editing control, the video recording terminal determines a second video clip having an interactive relationship with the first video clip.

For example, the video recording terminal may display a second video clip selection interface in a case that a first operation performed on the interactive editing control is received. The second video clip selection interface is used for selecting a video clip that establishes an interactive relationship with the first video clip.

In an embodiment of this application, a video clip establishing an interactive relationship with the first video clip is selected by using the second video clip selection interface. The video clip may be a newly recorded video clip or a video clip that has been recorded. In addition, the display form of the second video clip selection interface can also be different based on different sources of the second video clip. The embodiment of this application does not limit the display form of the second video clip selection interface.

For example, in a possible implementation, when the second video clip is a newly recorded video clip, after the video publisher clicks the interactive editing control, the video recording terminal starts the video recording component to record the new video clip, and a prompt interface is displayed after the new video clip is recorded. The prompt interface is used for prompting a video publisher whether to establish an interactive relationship between the new video clip and the first video clip. In this case, the prompt interface is the second video clip selection interface.

Alternatively, in another possible implementation, when the second video clip is a video clip that has been previously recorded, after the video publisher clicks the interactive editing control, the video recording terminal may display a video selection list. The video selection list includes the video clip that has been recorded. The video selection list is the second video clip selection interface.

Alternatively, in still another possible implementation, the video publishing terminal may display a selection box after the user performs the trigger operation (or first operation) on the interactive editing control. The selection box includes a plurality of options, each option corresponding to a source of a second video clip, for example, at least one of "Link a new video clip" and "Link a recorded video clip". After the video publisher selects an option, the video publishing terminal displays a selection interface of the corresponding option.

Figure 5:
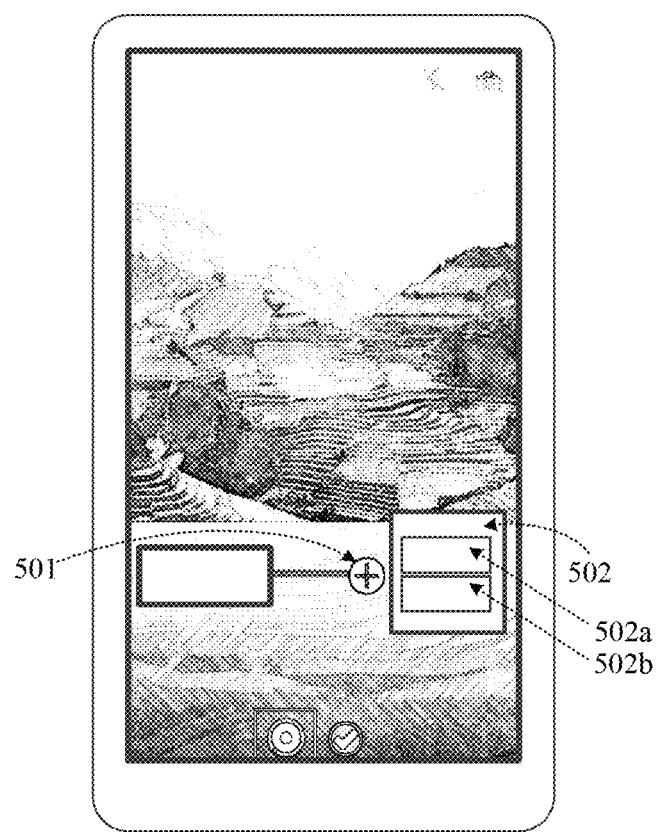
FIG. 5 is a diagram showing an operation interface for selecting a video clip in the embodiment shown in FIG. 3.

For example, FIG. 5 is a diagram showing an operation interface for selecting a video clip according to an embodiment of this application. As shown in FIG. 5, after a video publisher clicks an interactive editing control 501, the video recording terminal displays a selection box 502. The selection box 502 includes two options, namely, an option 502a "Link a new video clip" and an option 502b "Link a recorded video clip".

When the video publisher clicks the option 502a, the video recording terminal starts the video recording component to record a new video clip, and displays a prompt interface after the new video clip is recorded.

When the video publisher clicks the option 502b, the video recording terminal displays the video selection list including the names or icons of the video clips that have been recorded.

In step, interactive control information is generated.

The interactive control information may include an identifier of the second video clip. For example, the identifier of the second video clip may be a Uniform Resource Locator (URL) or the like of the second video clip.

For example, in a possible implementation, when the second video clip is a newly recorded video clip, the video recording terminal records the new video clip. After the new video clip has been recorded, the video recording terminal displays a prompt interface. The prompt interface is used for prompting whether to establish an interactive relationship between the new video clip and the first video clip. If the video publisher performs the selection operation on "Ok" in the prompt interface, the video recording terminal determines the new video clip as the second video clip, and generates interactive control information between the first video clip and the second video clip.

That is, when the second video clip is a newly recorded video clip, the video recording terminal first starts the video recording component to record the second video clip before generating the interactive control information corresponding to the first video clip and the second video clip.

In an embodiment, if the video publisher performs a selection operation on "Cancel" in the prompt interface, the video recording terminal discards the new video clip and records a new video clip again.

Alternatively, in another possible implementation, when the second video clip is a video clip that has been previously recorded, the video recording terminal displays a video selection list. After the video publisher performs a selection operation on one or more recorded video clips in the video selection list, the video recording terminal generates interactive control information between the first video clip and the video clip selected by the user. When the video publisher selects two or more video clips in the video selection list, the video recording terminal generates interactive control information between the first video clip and each selected video clip.

In an embodiment, during the generation of the interactive control information corresponding to the first video clip and the second video clip, the video publisher may alternatively adjust the display parameter of the interactive control point corresponding to the second video clip. For example, adjustment of the position, size, shape, color, and transparency of the interactive control point may be made. In the method for adjusting the display parameter of the interactive control point of the second video clip by the video publisher is shown in the following steps 304a to 304c.

In step S304a, the video recording terminal displays an interactive graphic of the interactive control point corresponding to the second video clip on the upper layer of (or superimposed on) the target video image.

In an embodiment of this application, the video recording terminal may display the interactive graphic of the interactive control point corresponding to the second video clip on the upper layer of (or superimposed on) the target video image according to the default display parameter. The interactive graphic may be a pattern having the same shape as the interactive control point corresponding to the second video clip.

It may be understood that the interactive graphic of the interactive control point is a graphical representation of the interactive control point on the screen.

In step S304b, the video recording terminal acquires an adjusted display parameter of the interactive control point in a case that a parameter adjustment operation for the interactive graphic is received, the display parameter including at least one of a position parameter, a size parameter, a shape parameter, a color parameter, and a transparency parameter.

The position parameter may be a vertex coordinate (for example, the pixel coordinate of a vertex) of the interactive graphic. The size parameter may be the graphic size of the interactive graphic. For example, when the interactive graphic is circular, the size parameter may be the radius of the interactive graphic. When the interactive graphic is square, the size parameter may be the side length of the interactive graphic. The shape parameter may be a sequence number corresponding to the shape of the interactive graphic. The color parameter may be a sequence number or a color value corresponding to the color of the interactive graphic. The transparency parameter may be a transparency value of the interactive graphic.

In an embodiment of this application, the video publisher may perform a parameter adjustment operation on the interactive graphic, for example, adjust the position of the interactive graphic by using a drag operation, adjust the size of the interactive graphic by using a scaling operation, adjust the shape, color, and/or transparency of the interactive graphic by right-clicking a pop-up selection box. The video recording terminal acquires the display parameter of the adjusted interactive graphic according to the parameter adjustment operation performed by the video publisher.

In step S304c, the video recording terminal generates the interactive control information including an identifier of the second video clip and the display parameter.

Figure 6:
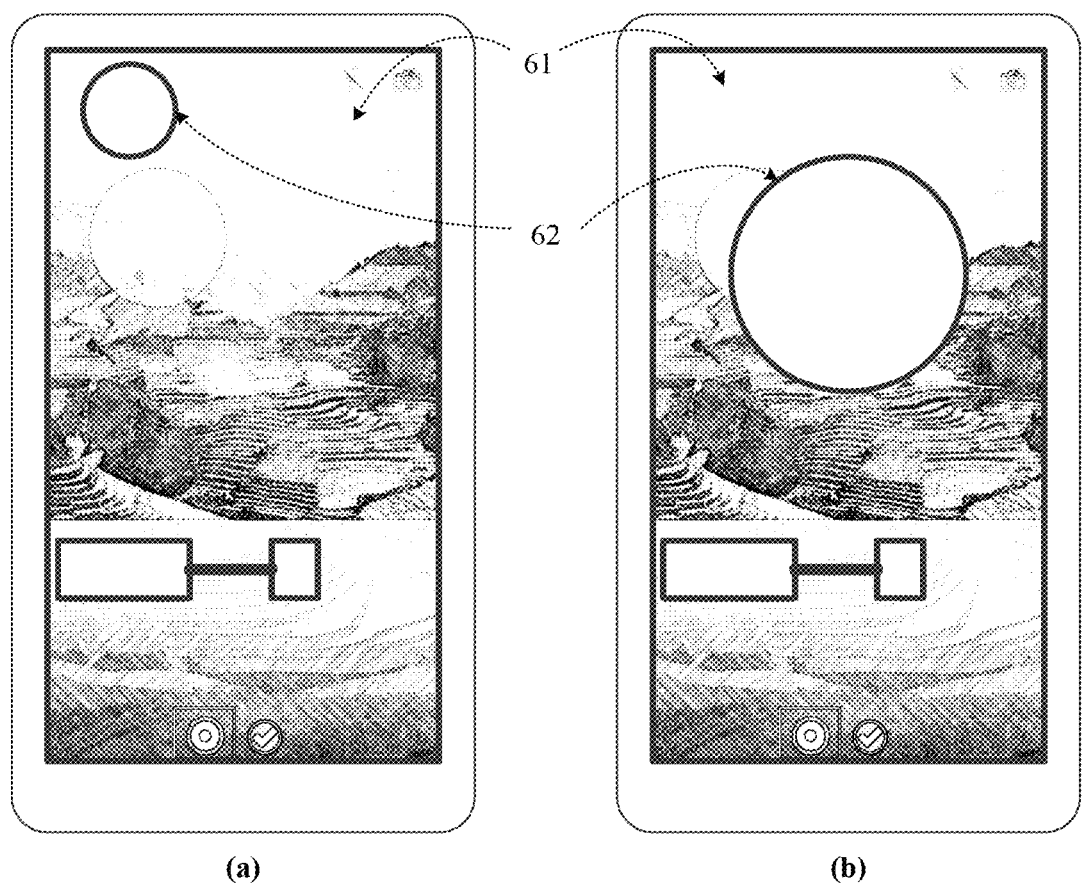
FIG. 6 is a schematic diagram of a parameter adjustment operation in the embodiment shown in FIG. 3.

For example, the size and position of an interactive graphic are adjusted. FIG. 6 is a schematic diagram of a parameter adjustment operation according to an embodiment of this application. As shown in FIG. 6, as shown in the part (a) of FIG. 6, the video recording terminal displays an interactive graphic 62 of an interactive control point corresponding to a second video clip on an upper layer of a target video image 61 according to a default display parameter. The interactive graphic 62 is circular. In this case, the interactive graphic 62 is located at the upper left corner of the target video image 61, and the size of the interactive graphic 62 is small. In this case, the video publisher may drag and scale the interactive graphic 62, as shown in the part (b) of FIG. 6. After dragging and scaling, the interactive graphic 62 is located in the middle of the target video image 61, and the size of the interactive graphic 62 is large. When the video publisher clicks an "Ok" button, the video recording terminal generates interactive control information corresponding to the second video clip. The interactive control information includes information such as the identifier of the second video clip, the center position coordinates of the interactive graphic 62 in the part (b) of FIG. 6, and the radius of the interactive graphic 62 in the part (b) of FIG. 6.

In an embodiment, after establishing an interactive relationship between one second video clip and the first video clip each time, the video recording terminal further displays a new interactive editing control corresponding to the icon of the first video clip, so that the video publisher may continue to add new second video clips having an interactive relationship with the first video clip.

In an embodiment, the video publisher may also set prompt information for an interactive control point of a second video clip having an interactive relationship with the first video clip, so that a user viewing the first video clip subsequently can choose, based on the prompt, a second video clip that the user wants to continue to watch. For example, the video recording terminal displays a prompt information editing control in a case that a trigger operation performed on the interactive editing control is received before the interactive control information is generated, and acquires prompt information of the second video clip according to an editing operation performed on the prompt information editing control, the prompt information being used for performing displaying corresponding to the interactive control point on the first video clip. Correspondingly, during the generation of the interactive control information, the video recording terminal may generate the interactive control information including the prompt information.

In an embodiment, when two or more second video clips have an interactive relationship with the first video clip, the prompt information may include common prompt information of the two or more second video clips and branch prompt information corresponding to the two or more second video clips respectively.

The prompt information may be a text, a rich text, an image or the like. The type of the prompt information is not limited in the embodiments of this application.

For example, the trigger operation (or first operation) performed on the interactive editing control is a long press-input operation, the prompt information is a text, and two or more second video clips have an interactive relationship with the first video clip. After detecting a long press operation of the video publisher on the interactive editing control, the video recording terminal may display a general text input box and respectively display one branch text input box on interactive graphics corresponding to the second video clips. The general text input box and the branch text input boxes are the prompt information editing controls. A user inputs common prompt information (for example, a question and answer (Q&A) question) in the general text input box and inputs branch prompt information (for example, answer options of the question) in the branch text input boxes corresponding to the video clips respectively. The video publishing may acquire the prompt information of the second video clip according to a text inputted by the video publisher.

In an embodiment, the prompt information of the second video clips may be set by the video publisher after each second video clip has successfully established an interactive relationship with the first video clip, or may be generally set by the video publisher after all the second video clips have successfully established an interactive relationship with the first video clip respectively.

In an embodiment, after establishing the interactive relationship between the first video clip and the second video clips (including generating interactive control information between the first video clip and the second video clips), the video recording terminal may display an interactive relationship between the icon of the first video clip and an icon of the second video clip in the form of a visual graphic on the upper layer (or superimposed) at the specified position of the target video image.

Figure 7:
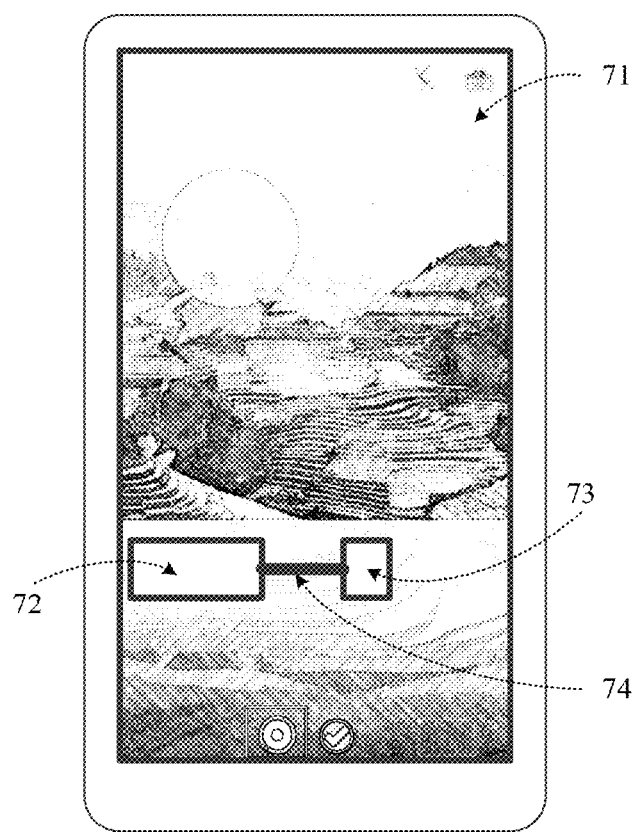
FIG. 7 is a schematic diagram of an interactive relationship between video clips in the embodiment shown in FIG. 3.

For example, FIG. 7 is a schematic diagram of an interactive relationship between video clips according to an embodiment of this application. As shown in FIG. 7, an icon 72 of a first video clip and an icon 73 of a second video clip are displayed on an upper layer at specified positions of a target video image 71. The icons 72 and 73 are connected to each other by a visible line 74 indicating that there is a corresponding interactive relationship between the respective video clips corresponding to the icons 72 and 73.

In an embodiment, the visible line 74 may be alternatively a directional arrow pointing from the icon 72 to the icon 73. The direction of the directional arrow indicates the playing order of the video clips corresponding to the icon 72 and the icon 73.

In an embodiment, the second video clip may be alternatively the first video clip. That is, the video playing terminal is instructed to replay the first video clip when the interactive control point corresponding to the second video clip is triggered.

Figures 8, 9:
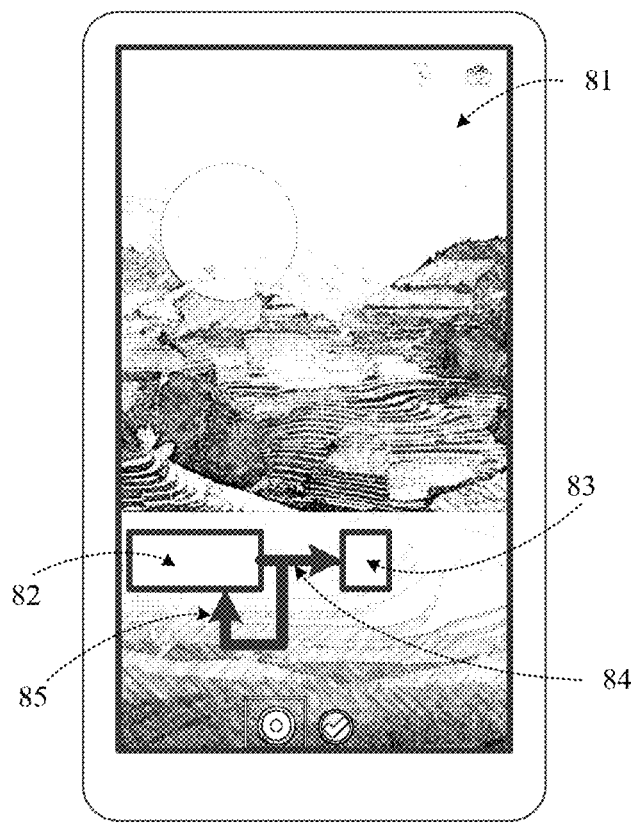
FIG. 8 is a schematic diagram of another interactive relationship between video clips in the embodiment shown in FIG. 3.
FIG. 9 is a schematic diagram of the information structure of control information in the embodiment shown in FIG. 3.

For example, FIG. 8 is a schematic diagram of another interactive relationship between video clips according to an embodiment of this application. As shown in FIG. 8, an icon 82 of a first video clip and an icon 83 of a second video clip are displayed on an upper layer at specified positions of a target video image 81. The icon 82 and the icon 83 are connected by a visible directional arrow 84 indicating that there is a corresponding interactive relationship between the respective video clips corresponding to the icon 82 and the icon 83. Another directional arrow 85 from the icon 82 points to the icon 82 indicating that another second video clip having an interactive relationship with the first video clip is the first video clip.

In step S305, the video recording terminal obtains the interactive video according to the first video clip, the second video clip, and the interactive control information.

In an embodiment of this application, when the first video clip has an interactive relationship with a plurality of second video clips, the video recording terminal may add interactive control information indicating that the first video clip corresponds to each second video clip to general control information of the first video clip.

In an embodiment of this application, the general control information may be organized and transmitted according to a JavaScript Object Notation (JSON) format.

For example, FIG. 9 is a schematic diagram of the information structure of control information according to an embodiment of this application. As shown in FIG. 9, the general control information of the first video clip includes two pieces of interactive control information, namely, interactive control information 1 and interactive control information 2. The interactive control information 1 corresponds to a second video clip 1 having an interactive relationship with the first video clip. The interactive control information 1 includes the center position coordinates and the radius of an interactive control point (circle) corresponding to the second video clip 1 and a URL of the second video clip 1. Correspondingly, the interactive control information 2 corresponds to a second video clip 2 having a link relationship with the first video clip. The interactive control information 2 includes the center position coordinates and the radius of an interactive control point corresponding to the second video clip 2 and a URL of the second video clip 2.

Figure 10:
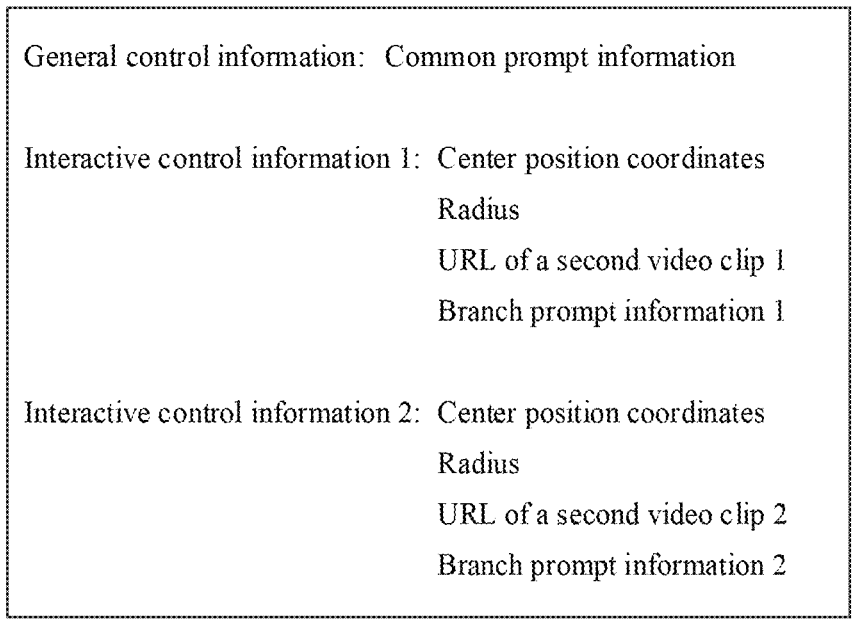
FIG. 10 is a schematic diagram of the information structure of other control information in the embodiment shown in FIG. 3.

In an embodiment, when the video publisher sets prompt information for the interactive control points of the second video clips, the control information further includes prompt information corresponding to the second video clips respectively. For example, FIG. 10 is a schematic diagram of the information structure of other control information according to an embodiment of this application. As shown in FIG. 10, the general control information of the first video clip includes two pieces of interactive control information, namely, interactive control information 1 and interactive control information 2. The video publisher sets common prompt information corresponding to the interactive control information 1 and the interactive control information 2 and branch prompt information corresponding to the interactive control information 1 and the interactive control information 2 respectively. The interactive control information 1 corresponds to a second video clip 1. The interactive control information 1 includes the center position coordinates and the radius of an interactive control point (circle) corresponding to the second video clip 1, a URL of the second video clip 1, and branch prompt information 1 corresponding to the second video clip 1. Correspondingly, the interactive control information 2 corresponds to the second video clip 2. The interactive control information 2 includes the center position coordinates and the radius of an interactive control point corresponding to the second video clip 2, a URL of the second video clip 2, and branch prompt information 2 corresponding to the second video clip 2. In addition, the general control information further common prompt information corresponding to the interactive control information 1 and the interactive control information 2 in addition to the interactive control information 1 and the interactive control information 2.

In an embodiment, the second video clip may also establish an interactive relationship with another subsequent video clip. For example, after the video recording terminal has successfully established the interactive relationship between the first video clip and the second video clip, in addition to that the interactive editing control corresponding to the icon of the first video clip is displayed on the upper layer at the specified position of the target video image, an icon of the second video clip is displayed on the upper layer at a specified position of the target video image, an interactive editing control is displayed corresponding to the icon of the second video clip, and the video publisher may select, according to a solution, another video clip that has established an interactive relationship with the second video clip, so that the video playing terminal may display an interactive control point of a next-level video clip having an interactive relationship with the second video clip during the playing of the second video clip.

In step S306, the video recording terminal uploads the interactive video to a server, and the video playing terminal acquires the first video clip in the interactive video and the interactive control information corresponding to the first video clip from the server.

When the video playing terminal acquires the first video clip from the server, the server may determine whether the first video clip includes corresponding interactive control information. If the first video clip includes corresponding interactive control information, the interactive control information and the first video clip are transmitted to the video playing terminal together.

Alternatively, in another possible implementation, the server may combine the first video clip and the interactive control information corresponding to the first video clip into a single video file. For example, the server may add the interactive control information to a file header of the first video clip and send the combined single video file to a video playing terminal. After receiving the video file, the video playing terminal extracts the first video clip and the interactive control information corresponding to the first video clip from the video file.

In step S307, during the playing of the first video clip, the video playing terminal displays an interactive control point corresponding to the second video clip on a playing interface of the first video clip according to the interactive control information.

In an embodiment, when the interactive control point corresponding to the second video clip is displayed in the playing interface of the first video clip according to the interactive control information, the video playing terminal may acquire a display parameter corresponding to the interactive control point from the interactive control information. The display parameter includes at least one of a position parameter, a size parameter, a shape parameter, a color parameter, and a transparency parameter. The video playing terminal displays the interactive control point corresponding to the second video clip on the playing interface of the first video clip according to the display parameter corresponding to the interactive control point.

In an embodiment, when two or more second video clips have an interactive relationship with a first video clip, the video playing terminal displays interactive control points respectively corresponding to the two or more second video clips on the playing interface of the first video clip.

For example, the interactive control point is a circular control by default. The display parameter includes a position parameter (the center coordinates) and a size parameter (the radius). When the video playing terminal plays a first video clip (for example, during playing, when playing is finished or when playing is paused), a circular interactive control point may be respectively displayed according to the center coordinates and the radius in each piece of interactive control information.

In an embodiment, when the interactive control information includes the prompt information of the second video clip, the video playing terminal may also acquire the prompt information corresponding to the interactive control point of the second video clip from the interactive control information and display the prompt information corresponding to the interactive control point of the second video clip.

In an embodiment, a video playing terminal may acquire remaining playing duration of a first video clip during the playing of the first video clip. The video playing terminal displays an interactive control point on a playing interface of the first video clip according to the interactive control information in a case that the remaining playing duration is not greater than a duration threshold or a ratio of the remaining playing duration to total playing duration of the first video clip is less than the proportion threshold.

In a possible implementation, the video playing terminal may display the interactive control point when the playing of the first video clip ends and stops. That is, the duration threshold or the proportion threshold is 0.

In another possible implementation, the video playing terminal may display the interactive control point when the first video clip has not finished playing (for example, during the playing or when the playing is paused). That is, the duration threshold or proportion threshold is not 0.

The duration threshold or the proportion threshold may be preset by a user corresponding to the video playing terminal or a developer. That is, for different video clips, the duration threshold or proportion threshold is a universal value.

Alternatively, the duration threshold or proportion threshold may be set by the video publisher for each video clip. The duration threshold or proportion threshold set corresponding to the first video clip is carried by the control information of the first video clip. That is, different video clips may have different duration thresholds or proportion thresholds.

For example, in step S304, a duration threshold or a proportion threshold corresponding to a threshold setting operation performed on the icon of the first video clip is acquired in a case that the threshold setting operation is received before the video recording terminal generates the interactive control information. The duration threshold is used for instructing to display the interactive control point corresponding to the second video clip in a case that remaining playing duration of the first video clip is less than the duration threshold. The proportion threshold is used for instructing to display the interactive control point in a case that a ratio of remaining playing duration of the first video clip to total playing duration of the first video clip is less than the proportion threshold.

For example, after the video recording terminal displays the icon of the first video clip, the video publisher may perform a threshold setting operation on the icon of the first video clip. For example, the video publisher may long press the icon of the first video clip and set or input the duration threshold or proportion threshold in a pop-up setting box.

In step S308, the video playing terminal jumps to the second video clip corresponding to the interactive control point for playing in a case that a trigger operation (or second operation) on the interactive control point is received.

In a possible implementation, when detecting a trigger operation event (or second operation) in the playing interface of the first video clip, the video playing terminal first determines whether the interactive control point corresponding to the second video clip is present at an operation position. If the interactive control point corresponding to the second video clip is present at the operation position, the video playing terminal plays the second video clip corresponding to the interactive control point. If the interactive control point corresponding to the second video clip is not present at the operation position, the video playing terminal transmits the trigger operation event to a video player, and processes the trigger operation event by the video player.

In an embodiment of this application, the interactive control point on the side of the video playing terminal is displayed by using a control frame. The picture in the video clip is displayed by using an original video frame. The control frame is always displayed on the upper layer of the original video frame. The original video frame is from the texture rendering shot by the camera.

In conclusion, in an embodiment of is application, during the recording of an interactive video, the interactive video is recorded in clips. After the video according terminal records the first video clip in the interactive video, an interactive relationship between the first video clip and the second video clip in the interactive video is set according to user operation. In addition, the interactive control information for indicating the interactive control point is generated, and the interactive video is obtained by combining the recorded video clips and the interactive control information. When the first video clip is played subsequently, the interactive control point may be displayed on the first video clip according to the interactive control information, and a user triggers the interactive control point to jump to the second video clip for playing. That is, in this application, during the playing of a video clip in the interactive video, the user may trigger the interactive control point to jump to another video clip having an interactive relationship with the current video clip in the same interactive video for playing, so that the user controls the playing sequence between different video clips in the video, thereby extending the modes of interaction between a user and a video.

In addition, in the solution provided in the embodiment of this application, when recording the interactive video, the video publisher may adjust the display parameter of the interactive control point corresponding to the second video clip, to customize the displaying appearance of the interactive control point, thereby improving the effect of interaction between a user and the interactive video.

In addition, in the solution provided in the embodiment of this application, when recording the interactive video, the video publisher may set the prompt information of the interactive control point corresponding to the second video clip, to customize the displaying of the interactive control point, thereby further extending the modes of interaction between a user and the interactive video.

Figure 11:
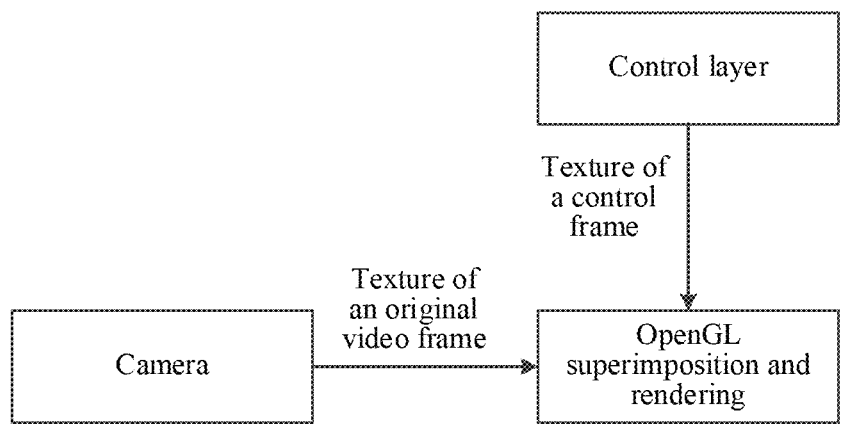
FIG. 11 is a diagram showing the principle of displaying an interactive control point according to an exemplary embodiment.

To facilitate the extension of application scenarios, embodiments of this application may be implemented by using a control layer developed based on the JavaScript (also referred to as JS) scripting language. For example, FIG. 11 is a diagram showing the principle of displaying an interactive control point according to an exemplary embodiment. As shown in FIG. 11, the control layer returns a display result of the control frame including the interactive control point to a native layer in a texture form. The native layer acquires the texture of the original video frame transmitted by the camera and the texture of the control frame transmitted by the control layer, and superimposes and renders the textures on the screen by using OpenGL ES.

Figure 12:
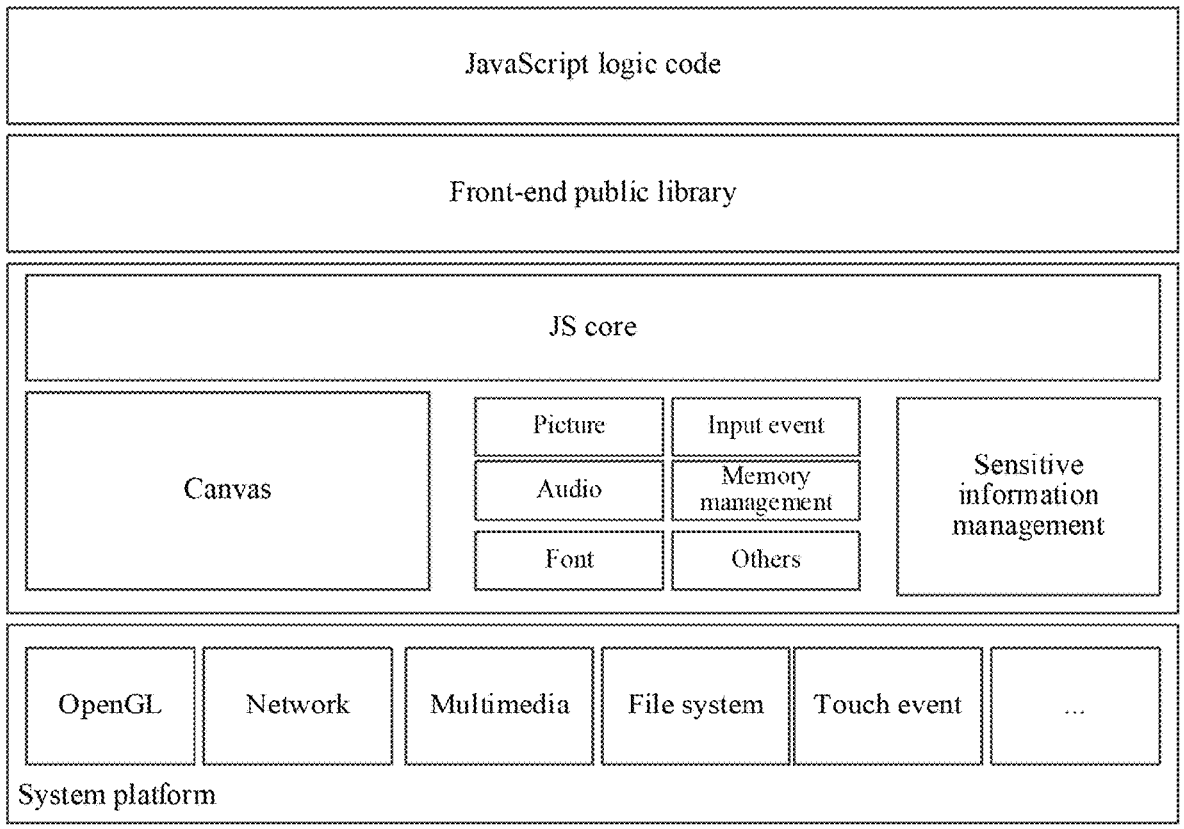
FIG. 12 is an architecture diagram of a JS engine in the embodiment shown in FIG. 11.

FIG. 12 is an architecture diagram of a JS engine according to an embodiment of this application. As shown in FIG. 12, a set of JS cores is introduced for JavaScript parsing in the embodiment of this application. To implement the communication between a JS layer and Native code, a set of C++-based h5, canvas interfaces can be implemented in the embodiment of this application. For example, JScore can call the native layer to draw a native canvas.

Figure 13:
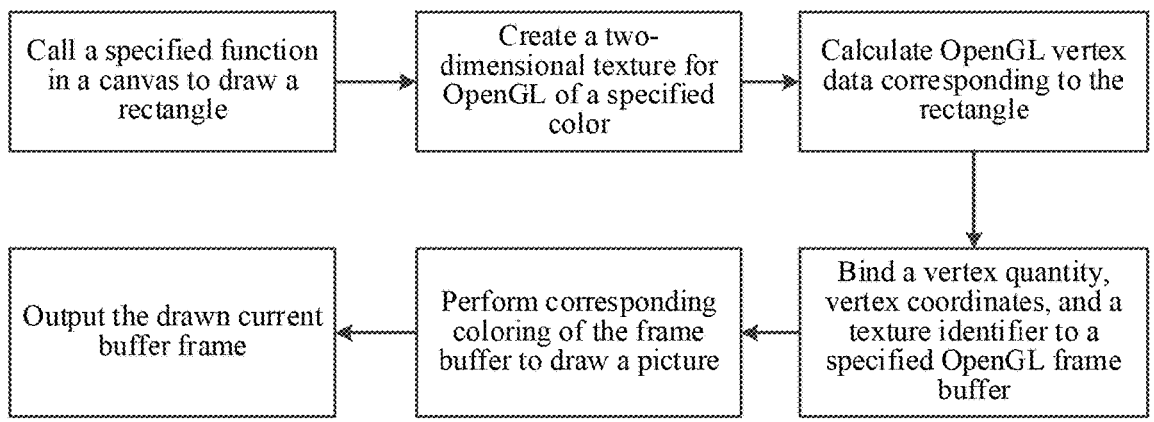
FIG. 13 is a schematic flowchart of texturing in the embodiment shown in FIG. 11.

FIG. 13 is a schematic flowchart of texturing according to an embodiment of this application. As shown FIG. 13, for example, the video recording terminal draws an icon (a rectangular icon) of the first video clip. The processing process from a JavaScript layer to a final output texture is as follows.

1). The JavaScript layer calls a specified function (for example, the fillRect function) in a canvas to draw a rectangle representing the first video clip.

2) A two-dimensional texture for OpenGL of a specified color is created.

3) The OpenGL vertex data corresponding to the rectangle of the first video clip is calculated according to the coordinates of the icon of the first video clip and the width and height of the screen.

4) A vertex quantity, vertex coordinates, and a texture identifier of the rectangle of the first video clip are bound to a specified OpenGL frame buffer.

5) Corresponding coloring of the frame buffer is performed to draw a picture.

6) The drawn current buffer frame is output.

Based on the software architecture, an implementation process of interactive video recording and video playing in the embodiment of this application may be as follows.

1. A video recording and publishing process includes the following steps.

1) When the shooting of a video clip is started, a recording thread starts recording a video, and another control thread is started at the same time to control the drawing of a user interface (UI).

2) The control thread monitors a video recording event and refreshes, on a control UI, the length of an icon (a strip/rectangular pattern) of a video clip that is being recorded.

3) The control thread monitors a pause event for video recording. After the recording of the first piece of video (corresponding to the first video clip) is finished, a "+" button (corresponding to the interactive editing control) that may be used for adding a branch is displayed on the control UI.

4) The video publisher clicks the "+" button on the control UI. The control UI draws a control point and a new video branch view. A user clicks a "Shoot" button on the control UI. The JavaScript layer instructs the native layer to call a shooting interface to continue to shoot a next video clip (that is, the linked second video clip is a new recorded video clip). In addition, the JavaScript layer generates control information.

5) The above steps are performed recursively to complete the shooting of an $N^{th}$ video clip.

6) The video publisher clicks a "Publish" button on the control UI. The JavaScript layer instructs the native layer to trigger the uploading and publishing of the video clips.

On the side of the server, a mode of multi-file storage is used to store the video clips in the interactive video. That is, a user on the side of the video playing terminal may click different interactive control points to play different video clips. The benefit of this is to implement more flexible control, and a video clip that is not clicked for playing does not need to be downloaded, to reduce the traffic for a terminal.

In addition, the interactive control information in the embodiment of this application is transmitted to the server in a JSON format. The server is responsible for transparently transmitting the interactive control information that is in JSON format to the side of the video playing terminal, and no additional processing is required.

2. A procedure of playing a video clip is as follows.

1) On the side of the video playing terminal, a hardware encoding scheme meidaCodec is used to decode every frame in a video, and GLsurfaceview is used to draw and render the image. In this processing manner, image data of every frame of image of the video may be directly obtained, making it possible to further process (for example, deform) an object in the image subsequently.

2) The JS layer draws a control frame at a specified playing time point according to the interactive control information to generate a texture, and deliver the generated texture to a rendering thread. The rendering thread performs superimposition by using OpenGL ES to draw the original video frame and the control frame.

3) A player first transmits a click operation event to the JS layer for processing in a case that a click operation is received. If the JS layer processes the click operation event, the player no longer processes the click operation event. That is, there is an interactive control point at a click position. The JS layer instructs the player to play the corresponding second video clip.

The embodiment of this application may be applied to a video sharing application such as a short video application. A framework for recording, publishing, and playing interactive videos is constructed in a product form of video clips. First, in the process of recording a short video, the video publisher may use an interactive relationship establishment operation to add interactive control information and a control logic. In a video uploading stage, the video clip and the interactive control information are simultaneously uploaded to the server. In a video play stage, the interactive control point is displayed at a specified time according to the interactive control information corresponding to the video clip. After the user clicks the interactive control point, the player makes different responses to play different video clips in the interactive video.

Figure 14:
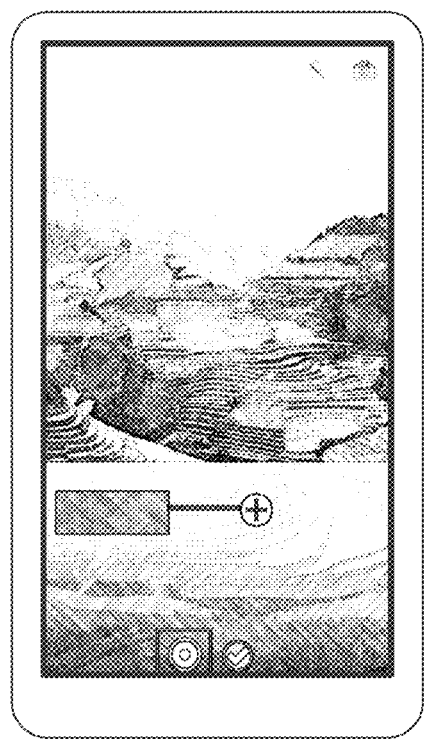
FIG. 14 is a schematic diagram of an interactive relationship establishment interface according to an exemplary embodiment.
Figure 14:
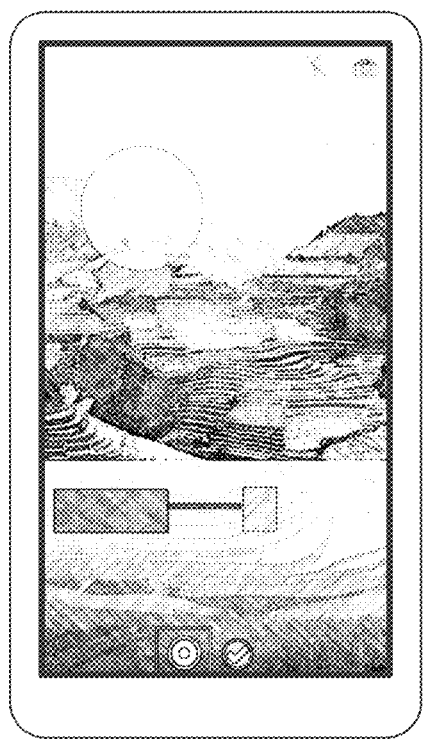
Figure 14:
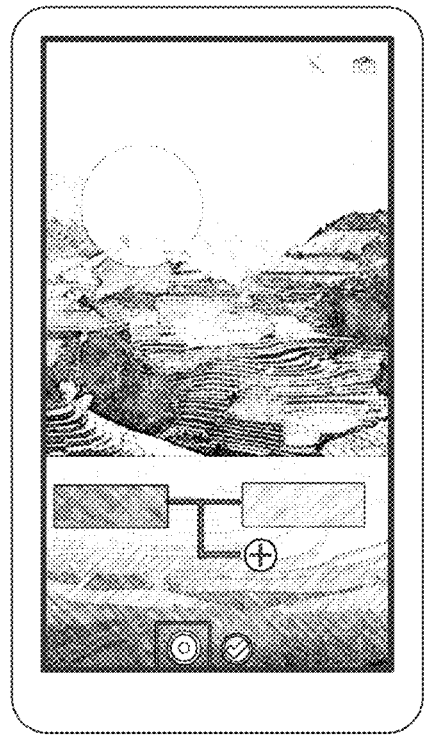
Figure 14:
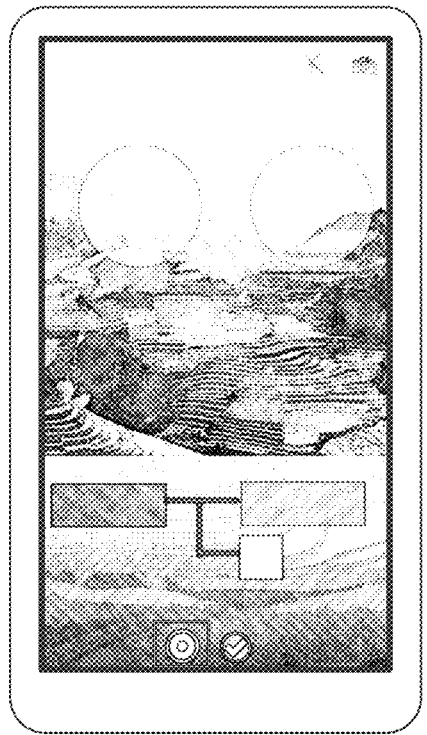

For example, FIG. 14 is a schematic diagram of an interactive relationship establishment interface according to an exemplary embodiment. As shown in FIG. 14, on a product side, after the video publisher uses the short video application to record a video clip in a short video, a "+" button (as shown by the part a in FIG. 14) for adding a branch appears in the interactive relationship establishment interface. After the "+" button is clicked, an interactive graphic of an interactive control point appears in the upper half of the interface. A drag may be performed to change the position and size of the interactive graphic. A recording button below is clicked to start the recording of a second branch video clip (as shown by the part b in FIG. 14).

After the second video clip has been recorded, a new "+" button appears (as shown by the part c in FIG. 14). When the video publisher clicks the new "+" button, an interactive graphic of a new interactive control point appears. The shooting button is clicked to start to record of a third video clip as a result video clip of the new interactive control point (as shown by the part d in FIG. 14).

In the recording process, the video publisher may select the branch or the interactive control point to implement a deletion operation on the video clip corresponding to the interactive control point. Any quantity of branch video clips may be added by using the "+" button. In the recording process, the video publisher may click an "Ok" button at any time to trigger the publishing of a video clip. As soon as the video is published, the position and the size of the interactive control point and the interactive control information of the video clip played after the interactive control point is clicked may be transmitted to the server.

In a video playing process, the video playing terminal acquires the interactive control information of the video clip in the short video by using the short video application. One or more interactive control points are displayed during the playing of the first video clip. When the user clicks different interactive control points, the player may play different result videos.

In the foregoing solution, control of the playing sequence of the video clips in the short video is mainly considered. Based on this process, various video recording, publishing, and playing methods may be created. For example, after a user watches one video clip, a multiple-choice task appears. The user needs to select the correct answer before the user can watch a next video clip. Otherwise, the user can only watch another completely different video clip. In this way, a video browsing user interacts with the video clips in the interactive video.

For example, at the video recording terminal, in the process of recording a short video and establishing an interactive relationship between video clips, an input control for prompt information is added. For example, the video publisher inputs a test item and a plurality of preset answers, and specifies a video clip to be played when the user selects the correct answer and a video clip to be played when the user selects an incorrect answer.

Figure 15:
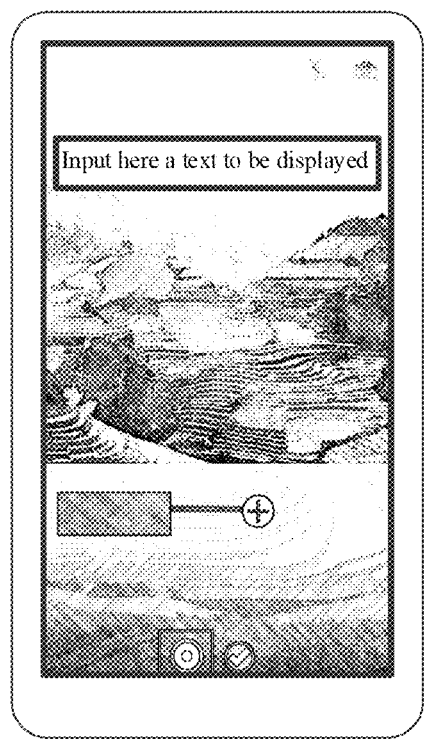
FIG. 15 is a schematic diagram of another interactive relationship establishment interface in the embodiment shown in FIG. 14.
Figure 15:
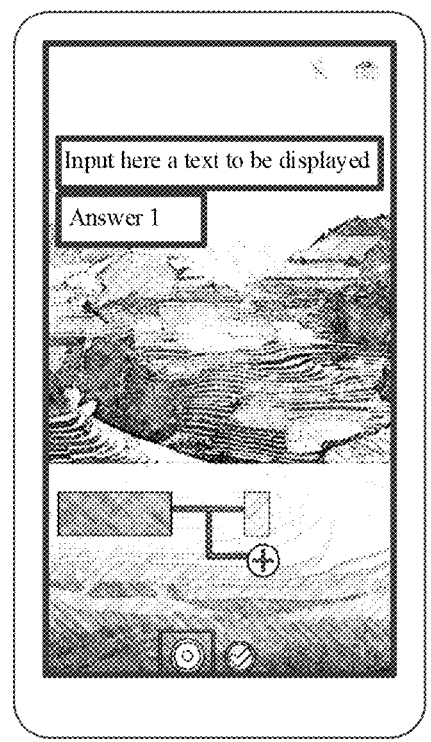
Figure 15:
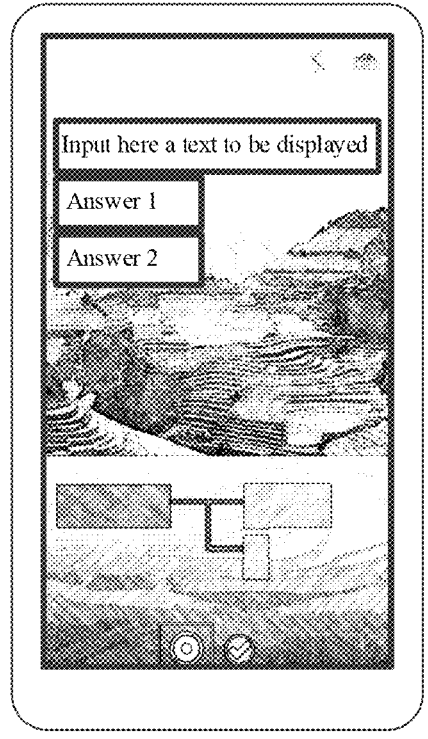
Figure 15:
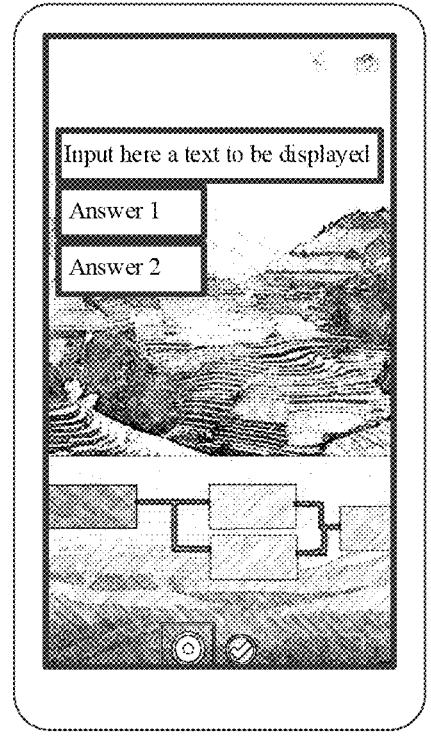

FIG. 15 is a schematic diagram of another interactive relationship establishment interface according to an embodiment of this application. As shown by the part a in FIG. 15, a product behavior in a recording stage is that after the video publisher records a video clip in a short video, an extended "+" and an item input control 1501 appear in the control layer. As shown by the part b in FIG. 15, after the video publisher inputs a question "Which of the following do you prefer?" and clicks "+", an input box 1502 for an answer 1 appears. The video publisher clicks the input box for the answer 1, inputs the answer 1 "XXBOYS", and clicks the shooting button to record a result video clip of the answer 1. As shown in the part c in FIG. 15, after the video publisher clicks "+", an input box 1503 for an answer 2 appears. The video publisher clicks the input box for the answer 2 and inputs the answer 2. "ZHAO XX" and clicks the shooting button to record a result video clip for the answer 2. As shown by the part d in FIG. 15, the video publisher finally may further record one same ending video clip. After linking a video, the video playing terminal further generates interactive control information, the interactive control information including the following content:

{"Question": "Which of the following do you prefer?",
"answers": [{"answer": "XXBOYS", "video":"video_url1"}, {"answer": "ZHAO XX", "video": "video_url2"}
"end": "last_video_url"}

Figure 16:
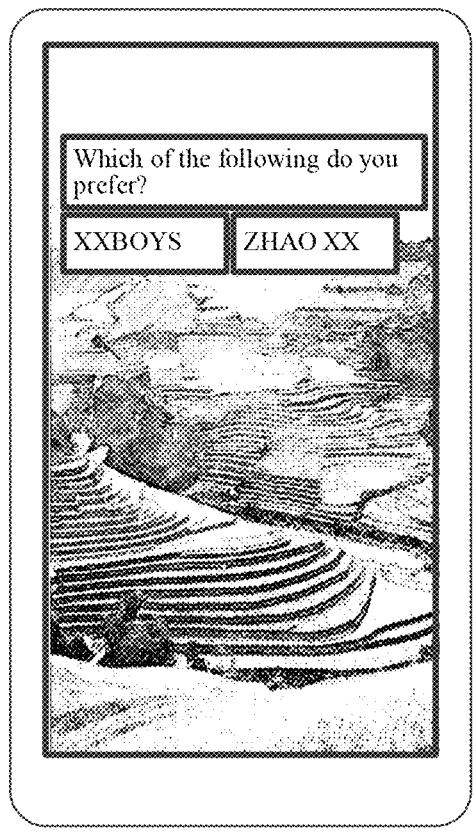
FIG. 16 is a schematic diagram of a playing interface in the embodiment shown in FIG. 14.

Correspondingly, FIG. 16 is a schematic diagram of a playing interface according to an embodiment of this application. As shown in FIG. 16, a product behavior in a playing stage is that after a first common video clip in a short video has been played, the preset question and the answer options appear on the screen of the video playing terminal. When the user clicks the answer 1, the first video clip and the ending video are played. When the user clicks the answer 2, the second video clip and the ending video are played.

Figure 17:
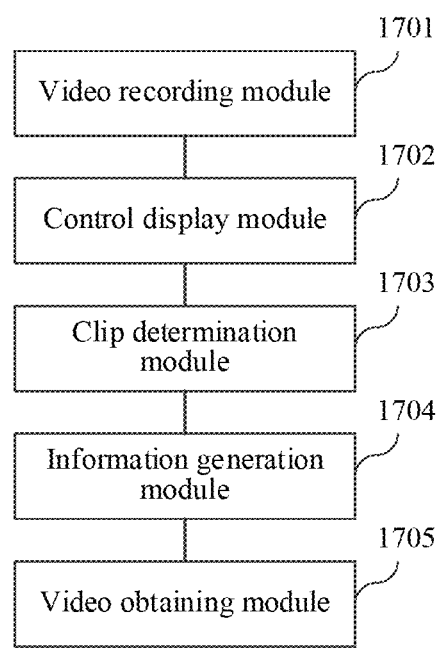
FIG. 17 is a structural block diagram of a video recording apparatus according to an exemplary embodiment.

FIG. 17 is a structural block diagram of a video recording apparatus according to an exemplary embodiment. The video recording apparatus is used for recording an interactive video. The interactive video includes at least two video clips having an interactive relationship. For example, the video recording apparatus may be applied to the video recording terminal 140 in the system shown in FIG. 1 to perform all or some steps performed by a video recording terminal in the method provided in the embodiment shown in FIG. 2 or FIG. 3. The video apparatus may include a video recording module 1701, a control display module 1702, a clip determination module 1703, an information generation module 1704, and a video obtaining module 1705. One or more of the modules can be implemented by processing circuitry, for example. The video recording module 1701 is configured to obtain a first video clip in the interactive video through recording by a video recording component.

The control display module 1702 is configured to display an interactive editing control corresponding to the first video clip.

The clip determination module 1703 is configured to determine a second video clip having an interactive relationship with the first video clip in a case that a trigger operation (or first operation) performed on the interactive editing control is received.

The information generation module 1704 is configured to generate interactive control information, the interactive control information being used for instructing to display an interactive control point on the first video clip. The interactive control point is used for triggering the playing of the second video clip in a case that a trigger operation of a user is received.

The video obtaining module 1705 is configured to obtain the interactive video according to the first video clip, the second video clip, and the interactive control information.

In an embodiment, the control display module 1702 is specifically configured to perform the following functions.

The control display module 1702 is configured to display a target video image, the target video image being any frame of the first video clip.

The control display module 1702 is configured to display an icon of the first video clip on an upper layer (or superimposed) at a specified position of the target video image.

The control display module 1702 is configured to display the interactive editing control corresponding to the icon of the first video clip.

In an embodiment, the information generation module 1704 is specifically configured to perform the following functions.

The information generation module 1704 is configured to display an interactive graphic of the interactive control point on an upper layer of (or superimposed on) the target video image.

The information generation module 1704 is configured to acquire an adjusted display parameter of the interactive control point in a case that a parameter adjustment operation for the interactive graphic is received, the display parameter including at least one of a position parameter, a size parameter, a shape parameter, a color parameter, and a transparency parameter.

The information generation module 1704 is configured to generate the interactive control information including an identifier of the second video clip and the display parameter.

In an embodiment, the apparatus further includes an editing control display module and a prompt information acquisition module.

The editing control display module is configured to display a prompt information editing control in a case that a trigger operation performed on the interactive editing control is received before the information generation module 1704 generates the interactive control information.

The prompt information acquisition module is configured to acquire prompt information of the second video clip according to an editing operation performed on the prompt information editing control, the prompt information being used for performing displaying corresponding to the interactive control point on the first video clip.

The information generation module 1704 is specifically configured to generate the interactive control information including the prompt information.

In an embodiment, the apparatus further includes a threshold acquisition module.

The threshold acquisition module is configured to acquire a duration threshold or a proportion threshold corresponding to a threshold setting operation performed on the icon of the first video clip in a case that the threshold setting operation is received before the information generation module 1704 generates the interactive control information. The duration threshold is used for instructing to display the interactive control point in a case that remaining playing duration of the first video clip is less than the duration threshold. The proportion threshold is used for instructing to display the interactive control point in a case that a ratio of remaining playing duration of the first video clip to total playing duration of the first video clip is less than the proportion threshold.

The information generation module 1704 is specifically configured to generate the interactive control information including the duration threshold or the proportion threshold.

In an embodiment, the apparatus further includes an interactive relationship display module.

The interactive relationship display module is configured to display an interactive relationship between the icon of the first video clip and an icon of the second video clip in the form of a visual graphic on the upper layer at the specified position of the target video image.

In an embodiment, the video recording module 1701 is further configured to start, in a case that the in generation module 1704 generates the interactive control information, the video recording component to perform recording to obtain the second video clip.

Figure 18:
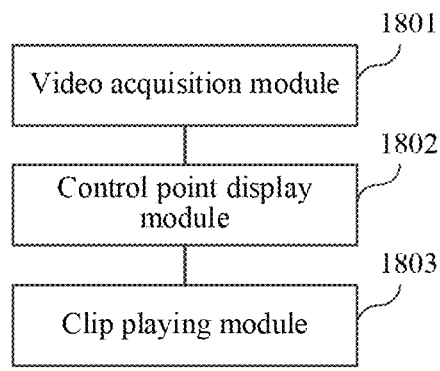
FIG. 18 is a structural block diagram of a video playing apparatus according to an exemplary embodiment.

FIG. 18 is a structural block diagram of a video playing apparatus according to an exemplary embodiment. The video play apparatus is configured to play an interactive video. The interactive video includes at least two video clips having an interactive relationship. For example, the apparatus may be applied to the video playing terminal 160 in the system shown in FIG. 1 to perform all or some steps performed by a video playing terminal in the method provided in the embodiment shown in FIG. 2 or FIG. 3. The video play apparatus may include a video acquisition module 1801, a control point display module 1802, and a clip playing module 1803. One or more of the modules can be implemented by processing circuitry, for example.

The video acquisition module 1801 is configured to acquire a first video clip in the interactive video and interactive control information corresponding to the first video clip. The interactive control information is information that is generated by a video recording terminal after the video recording terminal records a second video clip that is determined according to a trigger operation performed on an interactive editing control and has an interactive relationship with the first video clip. The interactive editing control is a control that is displayed after the video recording terminal performs recording to obtain the first video clip and corresponds to the first video clip.

The control point display module 1802 is configured to display an interactive control point on a playing interface of the first video clip according to the interactive control information.

The clip playing module 1803 is configured to play the second video clip in a case that a trigger operation on the interactive control point is received.

In an embodiment, the control point display module 1802 is specifically configured to perform the following functions.

The control point display module 1802 is configured to acquire a display parameter of the interactive control point from the interactive control information, the display parameter including at least one of a position parameter, a size parameter, a shape parameter, a color parameter, and a transparency parameter.

The control point display module 1802 is configured to display the interactive control point on the playing interface of the first video clip according to the display parameter of the interactive control point.

In an embodiment, the apparatus further includes a prompt information acquisition module and a prompt information display module.

The prompt information acquisition module is configured to acquire prompt information corresponding to the interactive control point from the interactive control information.

The prompt information display module is configured to display the prompt information corresponding to the interactive control point.

In an embodiment, the control point display module 1802 is specifically configured to perform the following functions.

The control point display module 1802 is configured to acquire remaining playing duration of the first video clip during the playing of the first video clip.

The control point display module 1802 is configured to display an interactive control point on a playing interface of the first video clip according to the interactive control information in a case that the remaining playing duration is not greater than a duration threshold or a ratio of the remaining playing duration to total playing duration of the first video clip is less than the proportion threshold.

Figure 19:
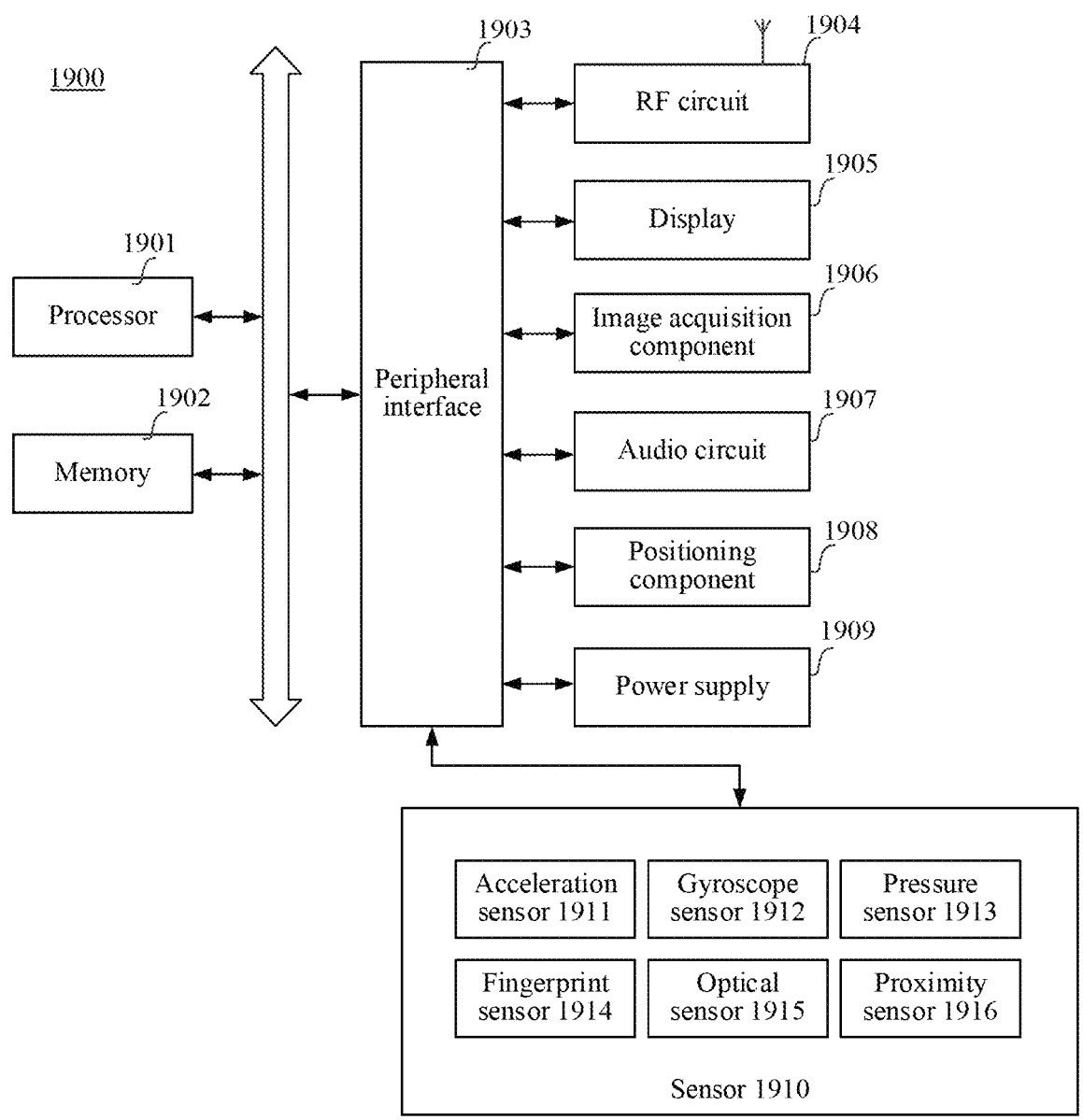
FIG. 19 is a structural block diagram of a computer device according to an exemplary embodiment.

FIG. 19 is a structural block diagram of a computer device 1900 according to an exemplary embodiment. The computer device 1900 may be a user terminal, for example, a smartphone, a tablet computer, an electronic book reader, smartglasses, a smartwatch, an MP3 player, an MP4 player, a laptop computer or a desktop computer. The computer device 1900 may also be referred to as user equipment (UE), a portable computer device, a laptop computer device, a desktop computer device, among other names.

Generally, the computer device 1900 includes a processor 1901 (processing circuitry) and a memory 1902.

The processor 1901 may include one or more processing cores, for example, a 4-core processor or an 8-core processor. The processor 1901 may also include a main processor and a coprocessor. The main processor is a processor configured to process data in an awake state and is also referred to as a central processing unit (CPU). The coprocessor is a low power-consumption processor configured to process data in a standby state. In some embodiments, the processor 1901 may be integrated with a graphics processing unit (GPU). The GPU is configured to render and draw content that needs to be displayed on a display. In some embodiments, the processor 1901 may further include an artificial intelligence (AI) processor. The AI processor is configured to process computing operations related to machine learning.

The memory 1902 may include one or more computer-readable storage media. The computer-readable storage medium may be non-transient. The memory 1902 may further include a high speed random access memory (RAM) and a non-volatile memory, for example, one or more magnetic disk storage devices or a flash memory storage device. In some embodiments, the non-transient computer-readable storage medium in the memory 1902 is configured to store at least one instruction, the at least one instruction being executed by the processor 1901 to implement the method performed by a video recording terminal or a video playing terminal in the methods provided in the method embodiments of this application.

In some embodiments, the computer device 1900 may optionally include a peripheral interface 1903 and at least one peripheral. The processor 1901, the memory 1902, and the peripheral interface 1903 may be connected by a bus or a signal cable. The peripherals may be connected to the peripheral interface 1903 by a bus, a signal cable or a circuit board. Specifically, the peripheral includes at least one of a radio frequency (RF) circuit 1904, a touch display 1905, an image acquisition component 1906, an audio circuit 1907, a positioning component 1908, and a power supply 1909.

The peripheral interface 1903 may be configured to connect at least one input/output (I/O)-related peripheral to the processor 1901 and the memory 1902.

The display 1905 is configured to display a UI. The UI may include a graphic, a text, an icon, a video or any combination thereof. When the display 1905 is a touch display, the display 1905 further has a capability of acquire a touch signal on or above the surface of the display 1905. The touch signal may be inputted into the processor 1901 as a control signal for processing. In this case, the display 1905 may further be configured to provide a virtual button and/or virtual keyboard, which is also referred to as a soft button and/or soft keyboard. In some embodiments, one display 1905 may be disposed at the front panel of the computer device 1900. In some other embodiments, at least two displays 1905 may be separately disposed on different surfaces of the computer device 1900 or designed in a foldable manner. In some still other embodiments, the display 1905 may be a flexible display and disposed on a curved surface or a folded surface of the computer device 1900. Even, the display 1905 may further be disposed into a non-rectangular irregular graphic, that is, a special-shaped screen. The display 1905 may be made of a liquid crystal display (LCD), an organic light-emitting diode (OLED) or the like.

The image acquisition component 1906 is configured to acquire an image or a video. In an embodiment, the image acquisition component 1906 includes a front-facing camera and/or rear-facing camera. Generally, the front-facing camera is disposed on the front panel of the computer device, and the rear-facing camera is disposed on the rear surface of the computer device.

In some embodiments, the computer device 1900 further includes one or more sensors 1910. The one or more sensors 1910 include, but are not limited to, an acceleration sensor 1911, a gyroscope sensor 1912, a pressure sensor 1913, a fingerprint sensor 1914, an optical sensor 1915, and a proximity sensor 1916.

A person of skill in the art can understand that the structure shown in FIG. 19 does not constitute a limitation on the computer device 1900 and may include components that are more or fewer than those shown in the figure, or a combination of some components, or different component arrangements.

In an exemplary embodiment, a non-transitory computer-readable storage medium including an instruction, for example, a memory including a computer program (instruction), is further provided, the program (instruction) being executed by a processor in a computer device to complete the method performed by a video recording terminal or a video playing terminal in the methods in the embodiments of this application. For example, the non-transitory computer-readable storage medium may be a read-only memory (ROM), a RAM, a compact disc ROM (CO-ROM), a magnetic tape, a floppy disk, an optical data storage apparatus or the like.

Other embodiments of this application will be apparent to those skilled in the art from consideration of the specification and practice of this application disclosed herein. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary and the real scope and spirit of this application are pointed out in the following claims.

It is to be understood that this application is not limited to the precise structures described above and shown in the accompanying drawings and various modifications and changes can be made without departing from the scope of this application. The scope of this application is limited only by the appended claims.

It is to be understood that although the steps in the flowcharts of the embodiments are sequentially shown according to the indications of arrows, the steps are not necessarily sequentially performed according to the sequence indicated by the arrow.

What is claimed is:

1. A video recording method, the method comprising:
displaying, on a display of a video recording terminal, a first video clip stored in a storage of the video recording terminal;
displaying, on the display of the video recording terminal, an interactive editing control interface over the first video clip displayed on the display;
determining, by circuitry of the video recording terminal according to a user input, a second video clip to be associated with the first video clip in response to a first operation performed on the interactive editing control interface;
generating, by the circuitry of the video recording terminal, interactive control information according to the first operation, the interactive control information instructing a video playing terminal to display an interactive control interface on a playing interface displaying the first video clip and to play the second video clip in response to a second operation performed on the interactive control interface; and
generating, by the circuitry of the video recording terminal, an interactive video to be stored in the storage of the video recording terminal, the interactive video including the first video clip, the second video clip, and the interactive control information.

2. The method according to claim 1, wherein the displaying the first video clip comprises:
displaying a target video image, the target video image being a frame of the first video clip, and
the displaying the interactive editing control interface comprises:
displaying an icon representing the first video clip superimposed at a specified position of the target video image; and
displaying the interactive editing control interface corresponding to the icon representing the first video clip.

3. The method according to claim 2, wherein the generating the interactive control information comprises:
displaying an interactive graphic of the interactive control interface superimposed on the target video image;
acquiring an adjusted display parameter of the interactive control interface in a case that a parameter adjustment operation for the interactive graphic is received; and
including an identifier of the second video clip and the adjusted display parameter in the interactive control information.

4. The method according to claim 2, further comprising:
displaying a prompt information editing control interface in response to a third operation performed on the interactive editing control interface; and
acquiring prompt information of the second video clip according to an editing operation performed on the prompt information editing control interface, the prompt information being displayed corresponding to the interactive control interface on the first video clip, wherein the generating the interactive control information comprises:
including the prompt information in the interactive control information.

5. The method according to claim 2, further comprising:
acquiring a duration threshold corresponding to a threshold setting operation performed on the icon representing the first video clip in a case that the threshold setting operation is received, the duration threshold instructing the video playing terminal to display the interactive control interface in a case that remaining playing duration of the first video clip is less than the duration threshold,
wherein the generating the interactive control information comprises:
including the duration threshold in the interactive control information.

6. The method according to claim 2, further comprising:
acquiring a proportion threshold corresponding to a threshold setting operation performed on the icon representing the first video clip in a case that the threshold setting operation is received, the proportion threshold instructing the video playing terminal to display the interactive control interface in a case that a ratio of remaining playing duration of the first video clip to total playing duration of the first video clip is less than the proportion threshold,
wherein the generating the interactive control information comprises:
including the proportion threshold in the interactive control information.

7. The method according to claim 2, further comprising:
displaying an interactive relationship between the icon representing the first video clip and an icon representing the second video clip by a visual graphic superimposed at the specified position of the target video image.

8. The method according to claim 1, wherein the determining the second video clip comprises:
displaying a selection box in response to the first operation performed on the interactive editing control interface, the selection box comprising at least one option, each option corresponding to a source of the second video clip;
acquiring a selected option, and displaying a selection interface corresponding to the selected option; and
acquiring the second video clip according to the user input through the selection interface.

9. The method according to claim 8, wherein the acquiring the second video clip according to the user input through the selection interface comprises:
starting, in a case that the selected option is an option of linking a new video clip, a video recording component to perform recording to obtain the second video clip; and
in a case that the selected option is an option of linking one of previously recorded video clips,
displaying a video selection list, the video selection list identifying the previously recorded video clips, and
acquiring the one of the previously recorded video clips selected from the video selection list as the second video clip.

10. The method according to claim 1, wherein the determining the second video clip comprises:
starting, in response to the first operation performed on the interactive editing control interface, a video recording component to perform recording to obtain the second video clip.

11. The method according to claim 1, wherein the determining the second video clip comprises:
  displaying a video selection list in response to the first operation performed on the interactive editing control interface, the video selection list identifying recorded video clips; and
  acquiring a video clip selected from the video selection list as the second video clip.

12. The method according to claim 1, wherein the determined second video clip is the first video clip, such that interactive video includes the first video clip associated with itself according to the interactive control information.

13. A video playing method, the method comprising:
  receiving, by circuitry of a video playing terminal, an interactive video that includes a first video clip, a second video clip, and interactive control information, the interactive control information being included in the first video clip or being included in a video file that includes the first video clip;
  displaying, on a display of the video playing terminal, the first video clip;
  displaying, on the display of the video playing terminal according to the interactive control information, an interactive control interface on a playing interface displaying the first video clip, the interactive control interface being superimposed on a target video image of the first video clip at a position of the target video image specified in the interactive control information; and
  playing, on the display of the video playing terminal, the second video clip as indicated in the interactive control information in response to a user operation performed on the interactive control interface.

14. The method according to claim 13, wherein the displaying the interactive control interface comprises:
  acquiring a display parameter of the interactive control interface from the interactive control information; and
  displaying the interactive control interface on the playing interface displaying the first video clip according to the display parameter of the interactive control interface.

15. The method according to claim 13, further comprising:
  acquiring prompt information corresponding to the interactive control interface from the interactive control information; and
  displaying the prompt information corresponding to the interactive control interface.

16. The method according to claim 13, wherein the displaying the interactive control interface comprises:
  acquiring remaining playing duration of the first video clip during playing of the first video clip; and
  displaying the interactive control interface on the playing interface displaying the first video clip according to the interactive control information in a case that the remaining playing duration is not greater than a duration threshold.

17. The method according to claim 13, wherein the displaying the interactive control interface comprises:
  acquiring remaining playing duration of the first video clip during playing of the first video clip; and
  displaying the interactive control interface on the playing interface displaying the first video clip according to the interactive control information in a case that a ratio of the remaining playing duration to total playing duration of the first video clip is less than a proportion threshold.

18. A video playing terminal comprising:
  a memory storing instructions; and
  processing circuitry configured to execute the instructions to perform the video playing method according to claim 13.

19. A non-transitory, computer-readable storage medium, the storage medium storing instructions, which, when executed by a processor, cause the processor to implement the method according to claim 13.

20. A video recording terminal, comprising:
  processing circuitry configured to:
    displaying, on a display of the video recording terminal, a first video clip stored in a storage of the video recording terminal;
    display, on the display of the video recording terminal, an interactive editing control interface over the first video clip displayed on the display;
    determine, according to a user input, a second video clip to be associated with the first video clip in response to a first operation performed on the interactive editing control interface;
    generate interactive control information according to the first operation, the interactive control information instructing a video playing terminal to display an interactive control interface on a playing interface displaying the first video clip and to play the second video clip in response to a second operation performed on the interactive control interface; and
    generate an interactive video to be stored in the storage of the video recording terminal, the interactive video including the first video clip, the second video clip, and the interactive control information.

* * * * *